US00RE47380E

(19) United States
(12) Reissued Patent
Bridgman et al.

(10) Patent Number: US RE47,380 E
(45) Date of Reissued Patent: May 7, 2019

(54) DRIVE-THRU SYSTEM AND METHOD

(71) Applicant: Restaurant Technology, Inc., Oak Brook, IL (US)

(72) Inventors: Ed Bridgman, Bolingbrook, IL (US); Alison Guy, Chicago, IL (US); Denis Weil, Chicago, IL (US); Dan Wohlfeil, Elmhurst, IL (US)

(73) Assignee: Restaurant Technology, Inc., Oak Brook, IL (US)

(21) Appl. No.: 13/780,232

(22) Filed: Feb. 28, 2013

Related U.S. Patent Documents

Reissue of:
(64) Patent No.: 7,895,797
Issued: Mar. 1, 2011
Appl. No.: 12/082,305
Filed: Apr. 10, 2008

(51) Int. Cl.
*E04H 6/42* (2006.01)
*E01F 9/00* (2016.01)
*E04H 14/00* (2006.01)

(52) U.S. Cl.
CPC ..... *E04H 14/00* (2013.01)

(58) Field of Classification Search
CPC ..... E04H 14/00; E04H 3/00
USPC ..... 52/174, 33, 176; 186/41, 36, 37
See application file for complete search history.

(56) References Cited

U.S. PATENT DOCUMENTS 3,788,755 A 1/1974 Davis
3,824,544 A 7/1974 Simjian
4,073,368 A 2/1978 Mustapick
4,388,689 A 6/1983 Hayman et al.
4,392,119 A 7/1983 Price et al.
4,547,851 A 10/1985 Kurland
4,675,515 A 6/1987 Lucero
4,722,053 A 1/1988 Dubno et al.
4,733,754 A 3/1988 Acosta
(Continued)

FOREIGN PATENT DOCUMENTS

CA 2044467 5/1995

OTHER PUBLICATIONS

Culver's Wikipedia cite, Jul. 9, 2007, at web.archive.org/web/20070710222606/http:/en.wikipedia.org/wiki/Culver's.*
(Continued)

*Primary Examiner* — Jeffrey L Gellner
(74) *Attorney, Agent, or Firm* — Hinshaw & Culbertson LLP

(57) ABSTRACT

A vehicular drive-thru food ordering and delivering system and method are provided. The system includes a lot, a drive-thru lane and a building for receiving and filling drive-thru orders. The building has a primary food delivery window for passing ready orders to drive-thru customers, and a downstream in-line parking area for drive-thru vehicles having a delayed order. Proximate to and downstream from the primary food delivery window is a doorway for attendant access from the primary food delivery window to the downstream in-line parking area. An attendant runway is proximate and downstream of the doorway and proximate to the in-line vehicle waiting area. A customer with a delayed order can be directed to wait in the downstream in-line waiting area. When the delayed order is ready for delivery, an attendant can deliver the ready order via the proximate doorway and proximate attendant runway to a vehicle waiting in the in-line vehicle waiting area.

57 Claims, 8 Drawing Sheets

(56) References Cited

U.S. PATENT DOCUMENTS

| | | | | |
|---|---|---|---|---|
| 4,843,547 | A | 6/1989 | Fuyama et al. | |
| 4,884,662 | A | 12/1989 | Cho et al. | |
| 4,935,720 | A | 6/1990 | Kalfoun | |
| 5,113,970 | A | 5/1992 | Bavis | |
| 5,128,862 | A | 7/1992 | Mueller | |
| 5,186,281 | A | 2/1993 | Jenkins | |
| RE34,872 | E | 3/1995 | Lucero | |
| 5,602,730 | A | 2/1997 | Coleman et al. | |
| 5,636,710 | A | 6/1997 | Ables et al. | |
| 5,804,807 | A | 9/1998 | Murrah et al. | |
| 5,898,158 | A | 4/1999 | Shimizu et al. | |
| 5,907,275 | A | 5/1999 | Battistini et al. | |
| 5,969,968 | A | 10/1999 | Pentel | |
| 5,974,393 | A | 10/1999 | McCullough et al. | |
| 6,087,927 | A | 7/2000 | Battistini et al. | |
| 6,366,220 | B1 | 4/2002 | Elliott | |
| 6,415,555 | B1 | 7/2002 | Montague | |
| 6,574,603 | B1 | 6/2003 | Dickson et al. | |
| 6,661,997 | B2 | 12/2003 | Ogo | |
| 6,722,473 | B1 | 4/2004 | Ramachandran et al. | |
| 6,842,719 | B1 | 1/2005 | Fitzpatrick et al. | |
| 6,940,393 | B2 | 9/2005 | Dev et al. | |
| 7,054,832 | B1 * | 5/2006 | Vallabh | G06Q 10/08 186/53 |
| 7,110,964 | B2 | 9/2006 | Tengler et al. | |
| 2002/0010632 | A1 | 1/2002 | Iguchi et al. | |
| 2002/0016747 | A1 | 2/2002 | Razumov | |
| 2002/0156682 | A1 | 10/2002 | DiPietro | |
| 2003/0046166 | A1 | 3/2003 | Liebman | |
| 2003/0149633 | A1 | 8/2003 | McConnell | |
| 2003/0195821 | A1 | 10/2003 | Kennamer | |
| 2004/0035643 | A1 * | 2/2004 | Dev | A47F 10/06 186/36 |
| 2004/0143503 | A1 | 7/2004 | Suthar | |
| 2004/0158499 | A1 | 8/2004 | Dev et al. | |
| 2004/0199425 | A1 | 10/2004 | Van Luchene et al. | |
| 2004/0249497 | A1 | 12/2004 | Saigh et al. | |
| 2005/0049921 | A1 | 3/2005 | Tengler et al. | |
| 2006/0006025 | A1 | 1/2006 | Dev et al. | |
| 2006/0218039 | A1 | 9/2006 | Johnson | |
| 2006/0218040 | A1 | 9/2006 | Sabapathypillai | |
| 2006/0271442 | A1 | 11/2006 | Pfleging et al. | |
| 2007/0073586 | A1 | 3/2007 | Dev et al. | |

OTHER PUBLICATIONS

Culver's at Belleville at www.michiganedc.org/funded-projects/culvers-belleville.*

International Searching Authority, International Search Report and Written Opinion, International Application No. PCT/US09/02185, Jun. 3, 2009.

* cited by examiner

DRIVE-THRU SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This invention relates to a drive-thru system and method for servicing vehicular drive-thru customers of a quick-service restaurant.

BACKGROUND OF THE INVENTION

Many quick-service restaurants include vehicular drive-thru service that allows drive-thru customers to place, pay for and receive delivery of a food order from a vehicular drive-thru lane, all without the drive-thru customers needing to leave their vehicles. Typically, the drive-thru lane includes an order station along the drive-thru lane that may be located remote of the restaurant building. At the order station a customer places an order by communicating with an attendant, such as by microphone and speaker. The attendant is positioned within the restaurant at a payment window that is located along the drive-thru lane and remote from the order station. Typically, as the order is received by the attendant, the attendant enters the order in point-of-sale equipment, such as an electronic cash register. After placing an order, the customer drives downstream to the payment window and pays the attendant for the order. The customer then is directed to a downstream pick-up window in the building to receive the customer's order from another attendant within the building.

Occasionally, the staff of the facility is not able to prepare a customer's order and have it ready for delivery by the time the customer has progressed to the order pick-up window or within a relatively short time thereafter. During the time the delivery of the order is delayed, the vehicle waits adjacent the order pick-up window. With the vehicle having the delayed order parked at the pick-up window, the continued servicing of upstream vehicles is hindered since continued access to the pick-up window is no longer possible for upstream vehicles. This is particularly significant if the order from the vehicle waiting at the order pick-up window is delayed for a relatively long period of time, such as on the order or one, two, three or more minutes. A further complication arises when upstream vehicles queue behind the parked vehicle at the pick-up window, and the queue eventually extends back to the payment window. In this case, the vehicle parked at the payment window is blocked from moving forward to allow further servicing of upstream vehicles at the payment window. Furthermore, orders for upstream vehicles may be ready for pick-up, but cannot be picked up because of the downstream vehicle at the order pick-up window that is waiting for its order. A still further complication arises if the queue of vehicles in the drive-thru lane extends upstream to the order station. When this happens, a vehicle that has completed ordering is likewise blocked from pulling forward from the order station. Vehicles upstream from the order station then cannot access the order station to place their order. Thus, the occurrence of delayed orders can seriously affect the services provided in the drive-thru system by reducing the throughput of the drive-thru system.

Such delayed orders are likely to cause the most serious problem during periods when the volume of vehicular use of the drive-thru system is greatest, i.e., breakfast, lunch and dinner time and other periods experiencing high arrival rates. In addition to negatively impacting the throughput of the drive-thru system, when a customer experiences longer than expected drive-thru service time, the customer becomes dissatisfied and is less likely to return to the facility in the future. Additionally, if a customer sees a drive-thru system that appears to have a long line or that appears to be backed up, such customer may equate that condition with a relatively long wait based on past experience and thus may choose to leave the premises without ordering, and then seek service from a competitor.

A need exists for a drive-thru ordering and delivery system with a higher vehicle throughput to allow a greater number of food orders to be received, processed and delivered per hour.

A need exists for a drive-thru ordering and delivery system that minimizes the effect of delayed orders on the system.

A need exists for a quick-service restaurant facility that provides greater throughput of drive-thru customers without additional exterior space requirements for the facility.

A need also exists for a quick-service restaurant lot layout with improved safety for pedestrian traffic for non-drive-thru customers.

SUMMARY OF THE INVENTION

In accordance with the present invention a vehicular drive-thru food ordering and delivering system is provided. The system includes a lot having a vehicular ingress and vehicular egress thereto. The system also includes a building for receiving and filling drive-thru customer orders for delivery to customers. The building has a primary food delivery or pick-up window for passing food orders through the primary food delivery window to a drive-thru customer located in a vehicle. A vehicular drive-thru lane is situated on the lot and passes adjacent to the primary food delivery window. The vehicular drive-thru lane is accessible from the lot vehicular ingress and has access to the lot vehicular egress. At least one order station is located remote from the building and along the vehicular drive-thru lane and upstream of the pick-up window. An in-line vehicle waiting area is located in the vehicular drive-thru lane a distance downstream of the primary food delivery window. The in-line vehicle waiting area includes one or more in-line vehicle waiting spaces in which a vehicle can await delivery of a delayed order. The distance between the primary food delivery window and the in-line vehicle waiting area is sufficient to allow an upstream vehicle leaving the primary food delivery window to drive forward and around a downstream vehicle waiting in the in-line vehicle waiting area and to the vehicle egress without backing up. An attendant runway is located downstream of the primary food delivery window and at least a portion of the attendant runway is positioned in an area outside the building and adjacent to the in-line vehicle waiting area to provide at least a portion of a path from the primary food delivery window to a vehicle waiting in the in-line vehicle waiting area without requiring an attendant to cross over the vehicular drive-thru lane. A building egress proximate to the primary food delivery window provides an attendant access from the primary food delivery window to the portion of the attendant runway that is outside the building to allow the delivery of an order to a vehicle waiting in the in-line vehicle waiting area. A second vehicle lane is positioned along at least a portion of the vehicular drive-thru lane adjacent the in-line vehicle waiting area and is of sufficient length and width to allow a vehicle leaving the primary food delivery window to drive forward and past a downstream vehicle waiting in the in-line vehicle waiting area without having to back up. Thereafter, the vehicle can proceed to the lot vehicular egress via the second vehicle lane.

In accordance with another aspect of the invention the system includes a display positioned adjacent to the in-line vehicle waiting area. This display displays information relating to a specific customer's order.

In accordance with another aspect of the invention the system includes a vehicle barrier positioned along and between at least a portion of the attendant runway and the vehicular drive-thru lane to protect an attendant on the attendant runway from vehicular traffic.

In accordance with another aspect of the invention the in-line vehicle waiting area includes first and second in-line vehicle waiting spaces. The second in-line vehicle waiting space is located downstream from the first in-line vehicle waiting space. The second in-line vehicle waiting space is spaced a sufficient distance from the first in-line vehicle waiting space so that a vehicle waiting at the first in-line vehicle waiting space can drive forward and around a vehicle waiting in the second in-line vehicle waiting space without backing up. The second vehicle lane is of sufficient length and width to allow a vehicle waiting at the first in-line vehicle waiting space to drive forward and around a downstream vehicle waiting in the second in-line vehicle waiting space without backing up and thereafter to proceed to vehicular egress.

In accordance with still another aspect of the invention the system includes a secondary food delivery window located downstream of the primary food delivery window. The secondary food delivery window is located adjacent the first in-line vehicle waiting space and along an enclosed attendant pathway from the primary food delivery window to the secondary food delivery window. The enclosed attendant pathway allows delivery of a delayed order through the secondary food delivery window to a vehicle waiting at the first in-line vehicle waiting space. The second in-line vehicle waiting space is located downstream of the building egress along the portion of the attendant runway that is outside of the building.

In accordance with yet another aspect of the invention the in-line vehicle waiting area includes a third in-line vehicle waiting space. The third in-line vehicle waiting space is located downstream of the second in-line vehicle waiting space and is adjacent a portion of the attendant runway that is outside the building.

In accordance with another aspect of the invention, a method of servicing customers in vehicles in a vehicular drive-thru food ordering and delivering system is provided. The system includes a vehicular drive-thru lane with a vehicular ingress and a vehicular egress, a primary food delivery or pick-up window for use by an attendant to receive payment for drive-thru orders not previously paid for, and to deliver ready orders to customers. The method includes delivering a first food order to a first customer in the vehicular drive-thru lane from the primary food delivery window if the first food order for the first customer is a non-delayed order, and thereafter allowing the first customer to exit the vehicular drive-thru lane at the vehicular egress. The first customer, when at the primary food delivery window and if the first order is a delayed order, is directed to move downstream from the primary food delivery window to wait in a downstream in-line vehicle waiting area. The in-line vehicle waiting area is located in the vehicular drive-thru lane, and the downstream in-line vehicle waiting area also is located proximate to the primary food delivery window. Drive-thru service is provided to a second customer in a vehicle that is upstream from the first customer while the first customer waits in the in-line vehicle waiting area for delivery of a delayed first order. The continued service for the second customer while the first customer waits for the delayed first order includes delivering a second order to the second customer from the primary food delivery window when the second order is a non-delayed order, and thereafter allowing the second customer to drive forward and around the first customer without backing up to exit at the vehicular egress. When ready for delivery, the delayed first order is delivered to the first customer waiting in the in-line vehicle waiting area by an attendant who takes the then ready delayed first order and exits the building through a doorway provided proximate to the primary food delivery window. Thereafter, the attendant walks along an outside attendant pathway to the first customer waiting in the in-line vehicle waiting area, wherein the attendant pathway from the primary food delivery window to the customer waiting in the in-line vehicle waiting area does not cross the drive-thru lane. After delivery of the first order to the first customer, the first customer is allowed to exit the vehicular drive-thru lane at the vehicular egress.

In accordance with another aspect of the present invention, a quick-service restaurant system for providing both vehicular drive-thru and non-drive-thru customer food ordering is provided. The system includes a lot with at least one vehicular ingress and at least one vehicular egress. A building situated on the lot is provided for preparing drive-thru and non-drive-thru customer orders and for delivery of the customer orders to the customers. A vehicle parking lot area has a plurality of parking spaces for non-drive-thru customers and has vehicular access to at least one vehicular ingress and at least one vehicular egress. A pedestrian pathway for non-drive-thru customers provides a pathway from the vehicle parking lot to the building to allow a non-drive-thru customer to place and receive an order thereat. A vehicular drive-thru pathway is provided for drive-thru customers. The drive-thru pathway includes at least one drive-thru lane with the drive-thru pathway having an inner perimeter. The vehicular drive-thru lane has access to at least one vehicular ingress and access to at least one vehicular egress for the lot. At least one order station is located along the drive-thru pathway for placing drive-thru orders by customers in vehicles. The building has a delivery window for delivering drive-thru orders to a customer in a drive-thru vehicle. The delivery window is located adjacent to the drive-thru pathway. The inner perimeter of the drive-thru pathway is located outwardly from all of the parking spaces of the non-drive-thru parking lot area and outwardly from the pedestrian pathways and the building, so that non-drive-thru customers can use the parking lot area and the pedestrian pathway without walking through the vehicular drive-thru pathway.

Other advantages and features of the invention will become apparent from the following description and from reference to the drawings.

DETAILED DESCRIPTION

Figure 1:
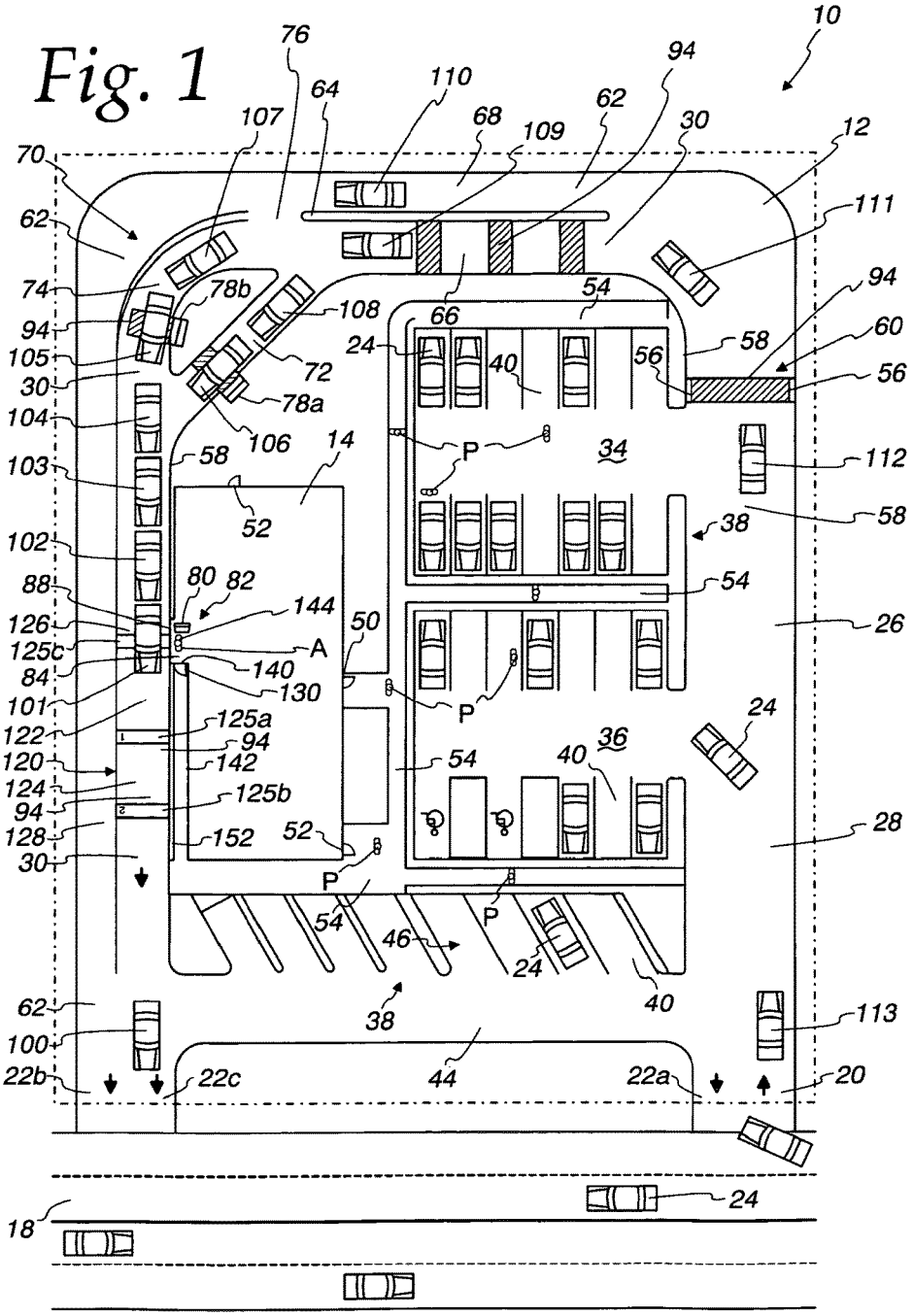
FIG. 1 is a plan view of the premises of the drive-thru system in accordance with the present invention.

While this invention is susceptible of embodiment in many different forms, there are shown in the drawings and described in detail herein, several specific embodiments with the understanding that the present disclosure is to be considered as exemplifications of the principles of the invention and is not intended to limit the invention to the embodiments illustrated.

Referring to the figures generally, and in particular FIG. 1, there is illustrated a quick-service restaurant premises 10 having a lot 12 on which is situated a restaurant building 14. The premises 10 typically will be located adjacent a street 18, although premises 10 may also be a section of a larger plat, such as that of a shopping center. An ingress 20 provides a vehicle entrance to premises 10 while egresses 22a, 22b,22c provide locations from which a vehicle 24 may exit premises 10 to street 18.

Building 14 preferably is equipped to service both drive-thru customers and non-drive-thru customers. Drive-thru customers are customers who can order, pay for, and receive delivery of a food order without leaving their vehicles. Non-drive-thru customers are customers who park their vehicles 24 on premises 10 and thereafter walk to building 14 to place, pay for, and receive food orders. Typically, building 14 will also include seating (not shown) where non-drive-thru customers can consume their food orders.

After entering ingress 20, vehicle 24 utilizing drive-thru service will follow lane portion 26 of entrance lane 28 which leads to a drive-thru lane 30 that travels around building 14, and thereafter exits premises 10 at egress 22c. A non-drive-thru customer also enters at ingress 20 and travels along lane portion 26 before pulling into and parking at parking sections 34 or 36 of parking lot 38. Alternatively, a non-drive-thru customer may enter at ingress 20 and choose to travel along front lane 44 to park in front parking lot section 46 of parking lot 38. A plurality of marked parking spaces 40 are provided in parking lot 38 for use by non-drive-thru customers.

After parking, non-drive-thru customers, represented in the drawings as people P, exit their vehicles 24 and walk to building 14 to receive service. Typically, building 14 will have a main building entrance 50, as well as one or more auxiliary entrances 52, where people P can enter building 14. Building 14 typically is equipped with an area to receive non-drive-thru customers to take their orders and payments, an area to prepare food orders, and a seating area for customers desiring to consume their food order in building 14.

People P moving to and from building 14 to receive non-drive-thru service may take various pathways or routes between parking spaces 40 and building 14. Such pedestrian routes of people P typically include walking through portions of parking lot 38 as well as walking along one of sidewalks 54 provided for that purpose. Considering that people P often includes small children, it is important to limit the exposure of the pedestrian pathways to and from building 14 to the pathway of vehicular drive-thru customers. This is especially true in view of the fact that those using drive-thru service may at times be traveling at a speed that is greater than that of non-drive-thru vehicles.

To increase safety for the pedestrian pathways, all of parking spaces 40 of parking lot 38 are situated to the interior of the inner perimeter 58 of the drive-thru pathway that includes entrance lane 28 leading to drive-thru lane 30, as well as drive-thru lane 30. By this arrangement, pedestrian pathways to and from building 14 are isolated from drive-thru traffic. Thus, regardless of which of parking spaces 40 of parking lot 38 a customer parks at, a safe pedestrian pathway to and from building 14 is available, and a person P utilizing non-drive-thru service need not cross into the path of drive-thru vehicular traffic.

In another aspect of the present invention, a highly efficient drive-thru system for drive-thru orders and deliveries is provided. The drive-thru system increases attendant productivity to drive-thru vehicle throughput capabilities without requiring a corresponding increase in labor costs. Moreover, as discussed later in greater detail, the higher rates are provided while at the same time allowing potentially reduced capital expenses, making efficient use of the square footage of the lot and without additional exterior space requirements for the building. Importantly, these advantages are achieved while at the same time customer satisfaction is increased by reducing the average time required for a drive-thru customer to receive service.

As illustrated in FIGS. 1-4, drive-thru lane 30 includes an open gateway or entrance area 60 that typically includes signage indicating that drive-thru service is available ahead of gateway 60 and that an exit to premises 10 is also available ahead of gateway 60. Gateway 60 may also include an iconic representation of the name or brand name of the company operating building 14 that may be provided on pillars 56 located adjacent the ends of gateway 60. Also downstream from gateway 60 is a pass-through or bypass lane 62 that lies to the outside of drive-thru lane 30. Bypass lane 62 can be used by customers who mistakenly have entered drive-thru gateway 60 as a quick and direct route for reaching premises egress 22b without becoming trapped behind vehicles using drive-thru lane 30. Bypass lane 62 can also be used as an alternative route for exiting premises 10 for non-drive-thru customers having parked in parking lot sections 34 or 36. A curb 64 may be provided to separate the rear segment 66 of drive-thru lane 30 from the rear segment 68 of bypass lane 62. A vehicle 24 desiring drive-thru service moves downstream along rear segment 66 of drive-thru lane 30 to approach the drive-thru lane corner 70. At corner 70, drive-thru lane 30 separates into two order lane segments 72 and 74 that lead to parallel order stations 78a and 78b, respectively. Optionally, additional parallel lane segments may be provided, such as 3, 4, 5 or more parallel lane segments, each having at least one order station. Downstream of the order stations the parallel lane segments merge back into a single drive-thru lane. At order stations 78, drive-thru customers may simultaneously place drive-thru orders. Ordering typically is accomplished without requiring customers to leave their vehicles. By positioning order stations 78 in a parallel configuration, a customer finishing order placement can proceed downstream, without having to wait behind a downstream vehicle that is not yet finished placing an order, as might occur if orders stations 78 were laid out in a series configuration along drive-thru lane 30.

Prior to entering segment 72 or 74, a customer can decide which route is likely to provide the quickest access to an open order station 78. For example, if order station 78a along inner lane segment 72 is already occupied, the customer can proceed along outer lane segment 74 to an available order station 78b. If both order stations 78 are occupied, the customer can elect to move in line behind the shortest queue at order stations 78. If both queues are of equal length, a driver can approach the lane that he determines is most likely to first become available. For example, if the customer noticed which of the two vehicles immediately preceded him down rear segment 66, the driver might choose to queue at the order station not selected by the immediately previous vehicle. Alternatively, a driver can wait upstream of the corner 70, and later choose to enter a queue for an order station 78 based on the progress of the vehicles at the order stations 78a, 78b. Corner 70 preferably also includes a drive-thru exit opening 76 located forward of curb 64. Exit opening 76 may be used by a customer who makes a decision to opt out of the drive-thru service, or by a customer who had mistakenly entered the drive-thru lane segment 66. Such a customer may use the drive-thru exit opening 76 to gain access to bypass lane 62 and proceed directly to premises egress 22b.

A customer can place an order at order station 78 by any suitable means. Such means preferably includes order station 78 having a display screen (not shown) for customer touch screen ordering. By touching various locations on the display screen, a customer can choose from items displayed on the screen to create a food order. As the order is being placed, the items ordered and the price of the order are displayed on the screen. The touch screen ordering system also preferably allows the customer to make corrections and/or additions to orders, then finally enter the order. Orders entered by a customer at an order station 78 are communicated to one or more computers that are located within building 14. Such communication may take place by networking, hard wiring, wireless communication or any other suitable means. Typically, at least one of these computers is a point-of-sale computerized cash register 80 that is located in the drive-thru order delivery area 82 of building 14. Order delivery area 82 provides a location where a drive-thru servicing attendant A can be positioned. Proximate to order delivery area 82 is a primary food delivery window 84 from which attendant A can pass through a prepared order from within building 14 to a drive-thru customer present at primary food delivery window 84. Primary food delivery window 84 typically is a slideable glass window for opening and closing as needed. Food delivery area 82 may include a veranda 88 to provide more convenient vehicle access to primary food delivery window 84 for receiving delivery of a customer order.

During the ordering process, attendant A and a customer at order station 78 are able to communicate with each other through speakers and microphones at order delivery area 82 and order stations 78. Thus, as an alternative to touch screen order entering, a customer may verbally place an order with attendant A. When taking a verbal order, attendant A can enter such order into the point-of-sale equipment, such as computerized cash register 80 that may have a touch screen, or other suitable order entry means. An order taken verbally from order station 78 and entered into cash register 80 by attendant A preferably causes the order to be displayed on the display screen at order station 78 for viewing and verification by the customer.

At order stations 78a, 78b, or proximate thereto, a drive-thru payment means is optionally provided to allow a customer to make payment for an order prior to reaching primary food delivery window 84. Such payment means preferably includes a cashless payment system for accepting payment by credit card, debit card or smart card, and may also include vending means for receiving cash from a customer and returning any change due. Alternatively, a customer may choose to pay later for an order at primary food delivery window 84, such as by handing a cash payment to attendant A at primary food delivery window 84.

The drive-thru system preferably also includes means for order tracking to associate a specific order with a specific vehicle. Any suitable means may be used to accomplish order matching. For example, a camera or cameras (not shown) that are located proximate to order station 78a, 78b or both may be positioned to take a digital photograph or image at the time an order is entered. The image is then associated, such as electronically associated, with the order that has been entered by the customer at order station 78, or taken verbally and entered by attendant A, into the point-of-sale electronic cash register 80. The image may be of the particular customer, the customer's vehicle, the customer's vehicle license plate, or any other identifying feature of the customer or vehicle. The image, or other identifying feature used, then is associated and stored with the corresponding order of the customer. For example, a computer program used for the ordering system may associate an image of the license plate of the vehicle with the order, and then display the photograph along with the order. Thus, a matched image and order, including items ordered and pricing, can be displayed on one or more display screens. One such display screen may be that of point-of-sale cash register 80 located in the food delivery area 82, such as at primary food delivery window 84, to be viewable by attendant A.

Other computer displays may be viewable by persons preparing the order, and as described later in greater detail, at a location downstream of primary food delivery window 84 for use in servicing customers with a delayed order. Alternatively, a printout of the order and the photo or other identifying means could be provided for attendant A's use to make delivery of the order to the proper vehicle.

In order to better describe the progression of vehicles 24 through the drive-thru system, certain vehicles 24 that appear in FIGS. 1-4 are assigned reference numerals 101-113. Vehicle 101 is shown as the vehicle that is furthest along through the drive-thru system, with vehicles 102-113 being in positions upstream and behind vehicle 101 in their progress through the drive-thru system. In FIG. 1 drive-thru vehicle 113 is shown just after entering premises 10 at ingress 20. A downstream drive-thru vehicle 112 is about to pass through gateway 60, while drive-thru vehicle 111 has passed through gateway 60 to follow drive-thru vehicle 109 down rear segment 66 of drive-thru lane 30. Vehicle 110 illustrates a vehicle that has opted out of drive-thru service, and instead is using bypass lane 62 to proceed directly to premises egress 22b. Vehicles 105 and 106 are parked at order stations 78b, 78a, respectively, and are in the process of placing a food order. Vehicles 107 and 108, shown queuing at order stations 78b and 78a, respectively, are awaiting their turn at an order station 78. Drive-thru vehicles 102, 103, 104, have previously placed their orders at one of order stations 78 and are now queuing behind vehicle 101 to receive delivery of their orders. Before reaching primary food delivery window 84, vehicles 101-104 optionally may have paid for their orders by cash, credit card, debit card, smart card or other payment means located at order station 78, or at a location provided between order station 78 and primary food delivery window 84. Drive-thru vehicle 101 has pulled up and adjacent to primary food delivery window 84 where payment will be collected by attendant A, if payment has not previously been made. Attendant A also will make delivery of an order to vehicle 101 through primary food delivery window 84, in instances where the order is ready for delivery. Vehicle 100 has placed, paid for, and received delivery of its order, and has proceeded downstream along drive-thru lane 30 to prepare to exit from premises 10 at egress 22c.

When vehicle 101 first pulls up to primary food delivery window 84, attendant A inspects the then pending drive-thru orders, i.e., those orders that have been previously ordered but not yet delivered to a drive-thru customer. Pending orders are available for inspection by attendant A by any suitable means. Preferably, pending orders are electronically stored and can be accessed and displayed at cash register 80. Thus, for example, the pending orders, including any delayed orders, are viewable at the display screen of cash register 80 located proximate to primary food delivery window 84. Attendant A can thereby conveniently monitor the status of all pending orders. When attendant A becomes aware that an order is ready for delivery, attendant A can view the display screen of cash register 80 to view the vehicle license plate number matched to that order, and then make delivery of that order to the correct vehicle. Alternatively, the pending orders may be accessed by attendant A in some other suitable manner, such as printouts of the pending orders including associated photographs or other vehicle identification information. Pending orders may also include a time stamp, or be sequentially numbered, to aid attendant A in determining the correct vehicle for a pending order that becomes ready for delivery, such as, for example, vehicle 101 now present at primary delivery window 84.

Once the order is matched, attendant A can inspect the order shown on the display or printout to determine if payment has been previously made. In the event payment needs to be collected, such fact may be highlighted in red type or other prominent notice. The information on a matched order can also be used by attendant A to determine if all ordered items are included in the package, or other container, to be delivered to vehicle 101. If the order for vehicle 101 is ready for delivery and payment has been made, the order is passed through primary food delivery window 84 to the driver of vehicle 101. Vehicle 101 then pulls forward along drive-thru lane 30 to exit the premises at egress 22c or if desired egress 22b.

If the order is not yet ready for delivery to vehicle 101, attendant A still collects payment in instances where payment was not previously made. Thereafter, attendant A informs the driver of vehicle 101 that the order will be ready shortly, and requests vehicle 101 to pull ahead to in-line vehicle waiting area 120. Target markings 125a-b are provided on drive-thru lane 30 to delineate the target location for a driver who is directed to pull ahead to await delivery of a delayed order. Each of the one or more in-line vehicle waiting spaces preferably will have its own target marking 125, such as target markings 125a, 125b indicating the target for a driver of a vehicle that is to wait for a delayed order delivery at in-line vehicle waiting spaces 122 and 124, respectively. Target markings 125a-b may also include indicia such as numbers, e.g., "1" and "2" for in-line vehicle waiting spaces 122, 124, respectively.

Depending on the number of delayed orders being experienced, or for other reasons, attendant A may at times deem it advisable to direct a customer having a delayed order to the more downstream in-line vehicle waiting space 124, rather than the closer in-line vehicle waiting space 122. In this way, if a subsequent delayed order is experienced before delivery is made to a vehicle waiting at in-line vehicle waiting space 124, the vehicle having the subsequent delayed order can enter an in-line vehicle waiting space by driving directly forward to in-line vehicle waiting space 122. To direct vehicle 101 to in-line vehicle waiting space 124 when both in-line vehicle waiting spaces 122, 124 are free, attendant A may request the vehicle 101, to please "pull forward to the space number 2" or "pull forward to the farthest space" and inform the customer that attendant A will bring the order to the vehicle shortly.

Figure 2:
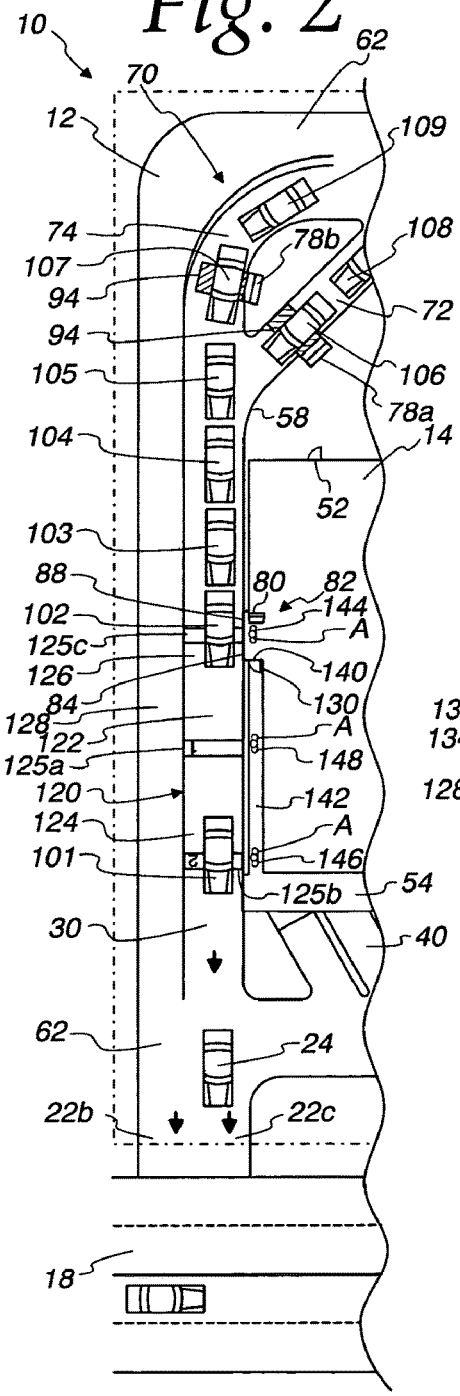
FIG. 2 is a fragmentary plan view of the premises of the drive-thru system showing a progression of drive-thru vehicles through the drive-thru system at a point in time later than that shown in FIG. 1.

FIG. 2 illustrates a point in time subsequent to the point in time represented by FIG. 1, wherein vehicle 101 has moved forward as directed by attendant A. At the option of attendant A, vehicle 101 has been directed to park at in-line vehicle waiting space 124 to await delivery of its delayed order. With vehicle 101 now having moved forward, access to primary food delivery window 84 has been made available for upstream vehicle 102. When vehicle 102 arrives at primary food delivery window 84, attendant A is available to provide drive-thru service for vehicle 102. Such service is provided in the same manner previously described in connection with vehicle 101. Specifically, attendant A locates and matches the applicable order for vehicle 102, requests and receives payment for the order for vehicle 102, if it has not been previously paid, and determines if the order for vehicle 102 is prepared, packaged and ready for delivery.

If the order is ready, attendant A hands the order through primary food delivery window 84 to vehicle 102. After taking delivery of the order at primary food delivery window 84, vehicle 102 is ready to exit premises 10. A direct pathway for vehicle 102 to egress 22c is blocked by vehicle 101 waiting at in-line vehicle waiting space 124 in drive-thru lane 30. In such instance, vehicle 102 turns outwardly into segment 128 of pass-through lane 62 and then continues forward in bypass lane 62 to pass vehicle 101 waiting at in-line vehicle waiting space 124. After passing vehicle 101, vehicle 102 can turn inwardly into drive-thru lane 30 and exit premises 10 at egress 22c. Alternatively, vehicle 102 can remain in bypass lane 62 and exit premises 10 at egress 22b. It can be appreciated that while only one of egresses 22b,c is required, preferably at least two egresses 22b,c are provided so as to avoid a back-up of vehicles waiting to exit premises 10. To provide increased traffic flow into premises 10, premises 10 also may have additional ingresses located in keeping with the teachings of the present invention.

Figure 3:
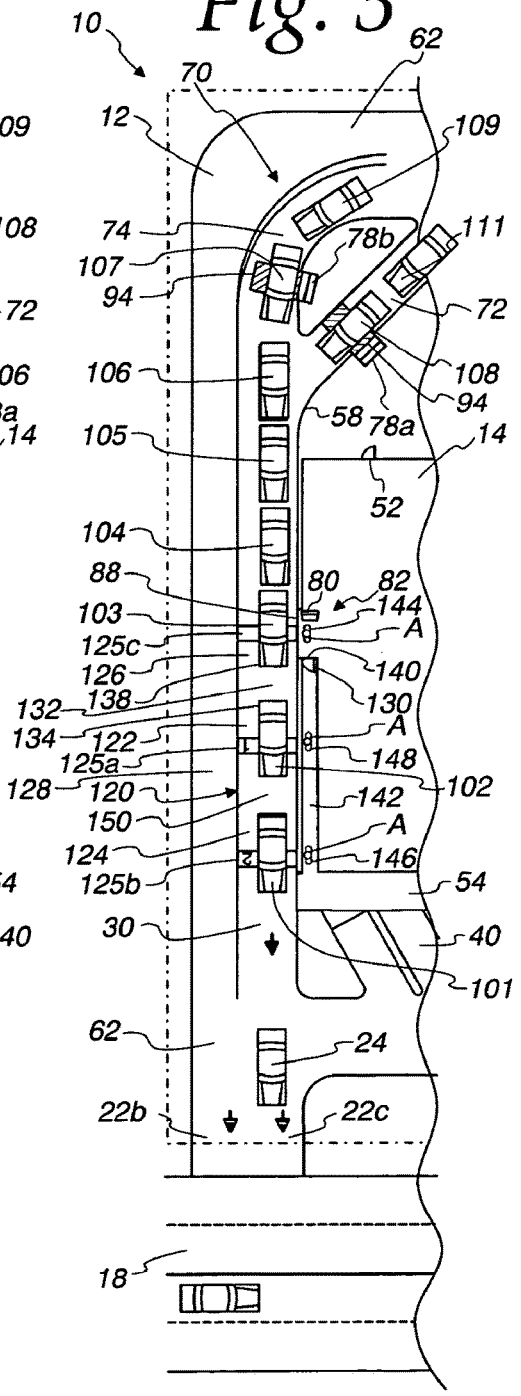
FIG. 3 is a fragmentary plan view of the premises of the drive-thru system showing a progression of drive-thru vehicles through the drive-thru system at a point in time later than that shown in FIG. 2.

If the order for vehicle 102 is not ready for delivery, attendant A directs vehicle 102 to pull forward to in-line vehicle waiting space 122 to await delivery of the delayed order. FIG. 3 illustrates both of vehicles 101 and 102 having moved to positions at in-line vehicle waiting spaces 124 and 122, respectively, to await delivery of their delayed orders. With vehicles 101 and 102 so waiting, primary food delivery window 84 has become accessible for servicing vehicle 103.

Figure 4:
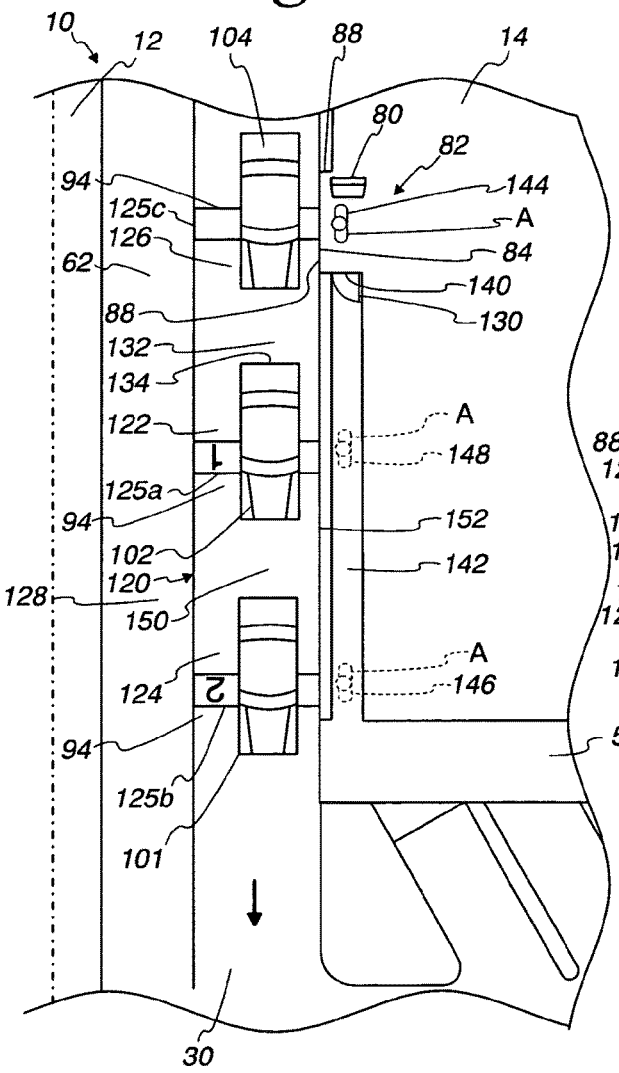
FIG. 4 is a fragmentary plan view of the premises of the drive-thru system showing a progression of drive-thru vehicles through the drive-thru system at a point in time later than that shown in FIG. 3.

At primary food delivery window 84, vehicle 103 receives customary drive-thru service as previous described. If vehicle 103 has a ready order for which payment has been collected, the order is passed through primary food delivery window 84 by attendant A to vehicle 103. Vehicle 103 is then ready to exit premises 10 by maneuvering around waiting vehicles 102 and 101. Waiting spaces 122 and 126 are of sufficient length to permit this by allowing a gap 132 between vehicle 103 at the waiting space 126 at primary food delivery window 84 and the immediately downstream vehicle 102 at in-line vehicle waiting space 122. Gap 132 provides a sufficient distance between the rear 134 of vehicle 102 and the front 138 of vehicle 103 so that vehicle 103 can drive forward and around vehicle 102 without having to backup. Gap 132 typically will be a sufficient distance when the center-to-center distance between vehicles 102 and 103 is about 30 feet or as otherwise needed for typical vehicles that are contemplated for the drive-thru. This can conveniently be accomplished providing a longitudinal spacing typically of about 30 feet from the center of primary food delivery window 84 and the center of target area 125a. Another way of providing a sufficient distance for gap 132 is by locating the center of target area 125c for primary food delivery window 84 and the center of target area 125a a distance of about 30 feet apart. Typically, the size of the vehicle waiting spaces, such as vehicle waiting spaces 122, 124, will be sufficient to accommodate a full-sized pick-up truck or full-sized sedan, but can be sized as desired. To exit premises 10, vehicle 103 turns into bypass lane segment 128 and proceeds past vehicles 102 and 101 to egress 22b. Primary food delivery window 84 is now available for servicing drive-thru vehicle 104, as shown in FIG. 4.

Figure 7:
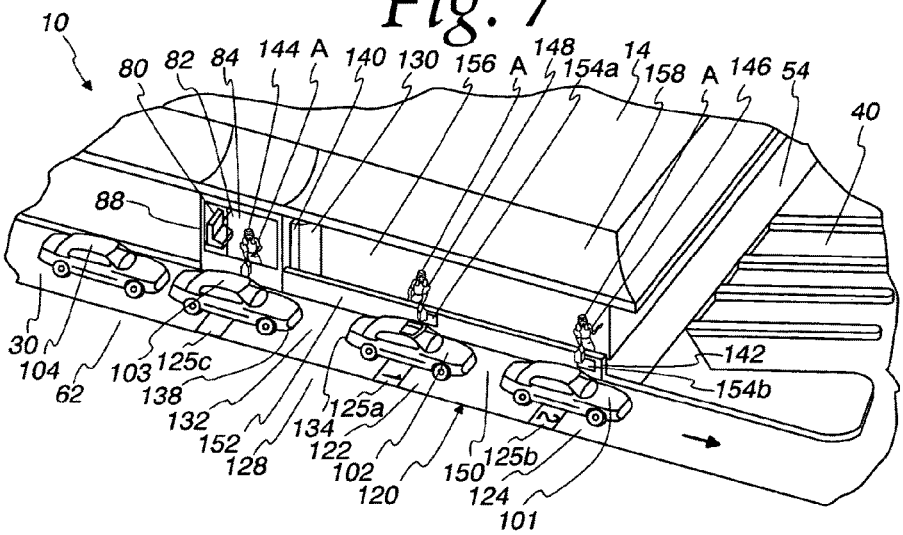
FIG. 7 is a fragmentary perspective view of the drive-thru facility in accordance with the first embodiment of the present invention.
Figure 8:
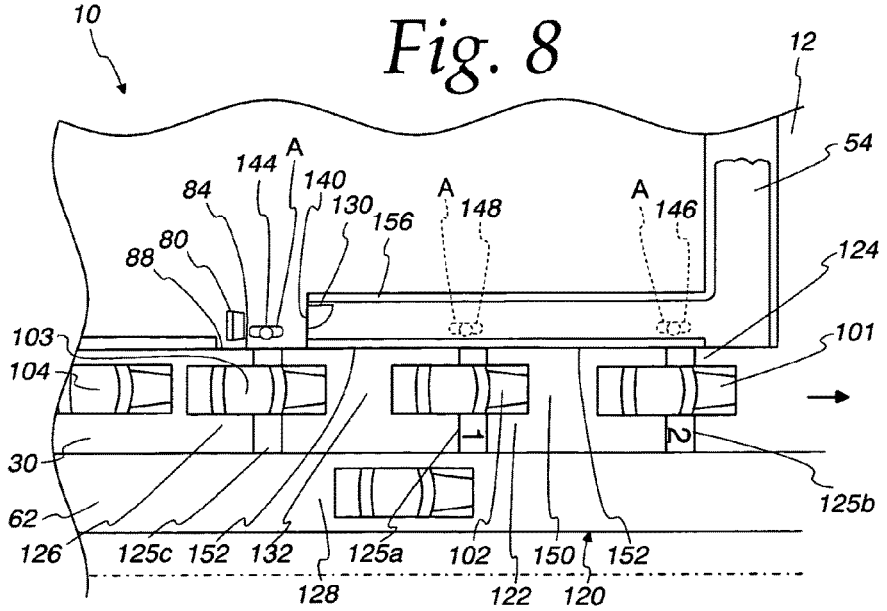
FIG. 8 is a fragmentary plan view of the facility of FIG. 7.

When a delayed order becomes available for either of delayed order waiting vehicles 101 or 102 waiting in in-line vehicle waiting area 120, the present invention allows such order to be quickly delivered to minimize the period of time that attendant A is absent from primary pick-up window 84. This can best be appreciated by viewing FIGS. 7 and 8, along with FIGS. 3 and 4. In FIGS. 7 and 8 it can be seen that food delivery area 82 has door 130 and a doorway 140. Doorway 140 provides direct access to an attendant runway 142 for use by attendant A to make delivery of a delayed order when it becomes ready to a vehicle waiting in one of in-line vehicle waiting spaces 122 or 124. It is noted that doorway 140 is located in close proximity to primary food delivery window 84 so that attendant A can quickly exit doorway 140 to make delivery of a delayed order to a vehicle in in-line vehicle waiting area 120.

For example, when an order becomes ready for vehicle 101, attendant A can utilize the aforementioned order matching means to determine that the order that is now ready is the order for waiting vehicle 101. Once so determined, attendant A leaves position 144 in food delivery area 82, exits building 14 via doorway 140 and walks along attendant runway 142 to position 146 adjacent the driver of vehicle 101. It is noted that doorway 140, in addition to being proximate to primary food delivery window 84, is also proximate to attendant runway 142 which, in turn, is proximate to in-line vehicle waiting area 120. The proximity of primary food delivery window 84, doorway 140, runway 142 and in-line vehicle waiting area 120 relative to each other is important to allow relatively rapid delivery of a delayed order by attendant A to a waiting vehicle. Due to the proximity of window 84 and in-line vehicle waiting area 120, and the direct path therebetween through doorway 140, attendant A can make delivery of a delayed order and return to window 84, without an appreciable slowing down of the customary functions needed to be performed at primary food delivery window 84, including order taking, payment receiving and order delivery. Alternatively, another attendant can deliver the delayed order to a vehicle at in-line waiting area 120.

Once the order is delivered to vehicle 101, vehicle 101 may then pull forward along drive-thru lane 30 to exit the premises at egress 22c. Attendant A then returns along attendant runway 142, passes through doorway 140 into building 14 to attendant position 144 at food delivery area 82. Having quickly returned to position 144 in food delivery area 82 attendant A continues to service vehicles in the drive-thru order system. If the delayed order for vehicle 102 had become ready before the delayed order for vehicle 101, attendant A would deliver the ready order to vehicle 102 by exiting building 14 at doorway 140 to attendant runway 142, and walking along attendant runway 142 to attendant position 148 adjacent the driver of vehicle 102. Attendant A would then deliver the order to vehicle 102, while vehicle 101, at in-line vehicle waiting space 124, continues to wait for delivery of its delayed order. After the order is delivered to vehicle 102, vehicle 102 may conveniently exit premises 10 despite the fact that vehicle 101 blocks the direct path along drive-thru lane 30 to egress 22c. This is because the spaces 122 and 124 are situated so that the gap 150 between waiting vehicle 101 and 102 is sufficient that vehicle 102 can readily maneuver past downstream waiting vehicle 101 without having to back up. To do so, vehicle 102 turns outwardly into segment 128 of bypass lane 62. Thereafter, vehicle 102 may proceed forward past vehicle 101, and once past vehicle 101, return to drive-thru lane 30 to exit premises 10 at egress 22c. Alternatively, vehicle 102 may choose to exit by use of egress 22b. Similarly, as discussed previously regarding gap 132, gap 150 typically will be a sufficient distance when the center-to-center spacing of vehicles 101 and 102 is about 30 feet. One way of providing such spacing between vehicles 101 and 102 is to situate target areas 125a and 125b so that their respective center-to-center spacing is about 30 feet.

FIGS. 7 and 8 show building 14 and in-line vehicle waiting area 120 in greater detail. A barrier 152 may be provided that is located between attendant runway 142 and drive-thru lane 30 to protect attendant A from vehicular traffic. Barrier 152 preferably is formed of a sturdy construction, such as, for example, brick, stone, concrete or concrete block to be capable of adequately protecting attendant A in case a vehicle impacts barrier 152. However, a lighter weight construction or even a portable type barrier 152 could alternatively be used, and still provide some level of protection from vehicular traffic for an attendant, or some other person, on attendant runway 142. Barrier 152 may be a wall that extends a sufficient distance from a point proximate to doorway 140 along in-line waiting area 120 to adequately protect attendant A's activities on attendant runway 142. Barrier 152 may be a wall that is approximately waist high to enable attendant A to easily pass packages containing an order to the driver of a vehicle. However, barrier 152 may be substantially higher and include one or more openings therein to provide convenient locations to allow attendant A on runway 142 to pass orders through such openings to a vehicle waiting at in-line vehicle waiting spaces 122 or 124. Barrier 152 may also be provided in the form of a continuation of an exterior wall of building 14 that extends downstream past doorway 140 and is located between in-line vehicle waiting area 120 and attendant runway 142.

A display screen 154 for displaying information about a delayed order is provided for viewing by drivers of vehicles waiting in in-line vehicle waiting area 120. In instances where in-line vehicle waiting area 120 includes more than one inline vehicle waiting space, such as in-line vehicle waiting spaces 122, 124, preferably each in-line vehicle waiting space will have a separate display screen 154a, 154b, respectively. Display screens 154a, 154b are positioned to be individually viewable by drivers of vehicles 102, 101, such as adjacent or slightly ahead of target location markings 125a-b at in-line vehicle waiting spaces 122 and 124, respectively. Display screen 154 may be secured to barrier 152 or at other locations whereby the display screen 154 is readily viewable by drivers when at in-line vehicle waiting spaces 122,124. Display screen 154 alternatively may be mounted on wall 156 of building 14. Depending on the location mounted, display screen 154 may be angled to provide better viewing by a driver of a waiting vehicle.

Display screens 154 are connected to communicate with the drive-thru computer system, for example the point-of-sale cash register 80, to display information specific to the respective orders of vehicles 101 and 102. Such communication may be by any suitable means, including hard wiring, networking, or wireless connection. The information displayed at display screens 154 typically includes the items ordered, individual prices of the items and the total pricing for a specific delayed order. When attendant A directs a vehicle with a delayed order forward to in-line vehicle waiting area 120, attendant A causes the specific order information to be displayed at display 154.

Attendant A causes the order for a vehicle to be displayed on a display screen 154a or 154b, for the in-line vehicle waiting space 122 or 124, respectively, that attendant A chooses to direct a vehicle to proceed to for awaiting delivery of an order. For example, if attendant A directs vehicle 102 forward to in-line vehicle waiting space 122, attendant A causes that specific delayed order information to be electronically displayed at display screen 154a. Causing order information to be displayed on a display screen 154 may be accomplished by any suitable means, such as, for example, attendant A making a keyboard or touch screen entry at point-of-sale computerized cash register 80 to cause the delayed order information for vehicle 101 to be displayed on display 154b for in-line waiting space 124. Similarly, for example, if vehicle 102 has a delayed order and is to be directed to in-line vehicle waiting space 122, attendant A would make entries at point-of-sale computerized cash register 80 to cause the delayed order information for vehicle 102 to be displayed at display 154a. Thus, the drivers of vehicles 101, 102 can verify that they are waiting at the correct one of in-line vehicle waiting spaces 124, 122 to await delivery of their delayed orders. The information displayed on display 154 may also include updates concerning when the order will be ready and other messages such as a reminder that the attendant will be delivering their meal, to be aware of traffic on their right, or other messages, promotions or advertising that the facility management deems advantageous.

Once a delayed order is delivered to a vehicle and such vehicle exits premises 10, the vacated space is then available for a subsequent delayed order for an upstream vehicle. At times, in-line vehicle waiting space 124 will become vacated while in-line vehicle waiting space 122 is occupied. In this case, a subsequent vehicle having a delayed order can, in the discretion of attendant A, be instructed by attendant A at primary food delivery window 84 to pull forward around in-line vehicle waiting space 122 to wait at in-line vehicle waiting space 124 or "space number 2" if so delineated by markings 125b. Alternatively, and also at the option of attendant A, in order to make it easier for a vehicle with the subsequent delayed order to enter in-line vehicle waiting area 120, a vehicle waiting in space 122 may be requested to move forward to in-line vehicle waiting space 124, or space "Number 2", if so delineated by markings 125b. Display screen 154a may also be used to communicate a request to a driver of a vehicle waiting at in-line vehicle waiting space 122 to proceed forward to a vacant in-line vehicle waiting space 124. This could be done by attendant A making entries at computerized cash register 80 to cause display 154a to provide a message to proceed forward. The message displayed may read for example, "Please proceed forward to next space" or "Please proceed forward to space #2, your order will be delivered shortly." This specific delayed order information for the vehicle asked to proceed forward is then displayed on display 154b at in-line vehicle waiting space 124. Thus, when the vehicle moving forward arrives at in-line vehicle waiting space 124 and reads display screen 154b, the driver will know that he has followed communicated instructions correctly. The instruction to move forward can be made at any time after a vehicle has received delivery of a delayed order and exited in-line vehicle waiting space 124. Optionally, means may be provided for allowing attendant A, when positioned proximate to primary food delivery window 84, to request a vehicle to move forward from in-line vehicle waiting space 122 to in-line vehicle waiting space 124. To accomplish this, a microphone or other communication device at primary food delivery window 84 is provided to communicate instructions from attendant A to a communication device such as a speaker located within audible range of the driver of a vehicle waiting at in-line vehicle waiting space 122. A communication device, such as a microphone, may also be provided proximate to in-line vehicle waiting space 122 so that a driver of a vehicle waiting thereat can communicate with attendant A through a speaker positioned proximate to primary food delivery window 84. A speaker and microphone may also be provided proximate to in-line vehicle waiting space 124 to allow communication by attendant A with vehicles at either of in-line vehicle waiting spaces 122, 124. Such communication may include providing updates or answering questions regarding a delayed order for a vehicle waiting in in-line vehicle waiting spaces 122, 124.

With in-line vehicle waiting space 122 now vacated after a vehicle has moved from in-line vehicle waiting space 122 to in-line vehicle waiting space 124, an upstream vehicle with a subsequent delayed order can conveniently pull forward to in-line vehicle waiting space 122 to await delivery, rather than having to maneuver around a vehicle waiting in in-line vehicle waiting space 122 to thereby reach in-line vehicle waiting space 124. Instructions to move forward may also be given by attendant A as attendant A is returning to doorway 140 after making delivery of an order to vehicle 101 waiting in in-line vehicle waiting space 124. Optionally, a remote outside electronic data entry means (not shown) may be provided adjacent runway 142 to allow for attendant A to cause displays screens 154a, 154b to change their displayed information and request a vehicle to proceed forward.

Proximity sensors 94 in communication with the computer of the drive-thru system may be provided for automatically causing display screen 154a to instruct vehicle 102 to move forward when it is sensed a vehicle has left in-line vehicle waiting space 124. When proximity sensors 94 sense that vehicle 101 has moved forward under the above-described conditions, the order for vehicle 102 is caused to be automatically displayed on displays 154a,b as previously described. Proximity sensors 94 may also be provided at additional locations in, on, or adjacent to drive-thru lane 30 to provide an indication to attendant A, by suitable means such as through the computer means of the drive-thru system, of the presence and location of vehicles within the drive-thru lane 30.

Display screens 154 may also be made to be viewable by attendant A to ensure that attendant A delivers the proper order to the proper vehicle. For example, display screens 154, or additional displays on the top or inside surface of barrier 152 or elsewhere, may display the photograph used in matching the order to the vehicle. An overhang or roof 158 may also be provided to protect the area of the attendant runway 142 and displays 154 from the elements.

The increased efficiencies of the drive-thru system operated in accordance with principles of the present invention provide a number of competitive advantages. These include increased throughput of drive-thru rates of customer orders placed and delivered; potential elimination of the need for a separate dedicated payment window in addition to a primary food order delivery window; potential reduction of lot square footage and/or reduction of the square footage of paved areas in the lot by having drive-thru lane 30 also include the integrated in-line vehicle waiting area 120, so that a separate area outside drive-thru lane 30 is not required to serve as a vehicle waiting area; and reduced labor costs relative to throughput quantity due to the increased efficiency of attendant A (i.e., because labor from another attendant or attendants is reduced or eliminated).

A major factor contributing to the latter advantage is the close proximity of in-line vehicle waiting area 120 relative to an attendant, such as attendant A, positioned at primary food delivery window 84, and the close proximity of attendant position 144 to doorway 140 leading to attendant runway 142. When a delayed order is experienced, attendant A is thereby able to expedite delivery of delayed orders with limited time away from primary delivery window 84. Thus, the performance of customary functions performed at position 144 by attendant A continues with only a momentary interruption. This is especially true in comparison to a situation where a customer experiencing a delayed order might have remained at a delivery window and thus caused a back-up of drive-thru lane service, or if the customer had been asked to park and wait in an area remote from drive-thru-lane 30, or where access to the outside for delivery of delayed orders is made via a door that is remote from a customary delivery window position 144. In such cases attendant A's time away from customary position 144 while customary duties are not being performed would significantly reduce hourly throughput of the drive-thru system. In the present invention throughput is not only maintained, but it is accomplished without the use of the services of one or more additional attendants, such as to make delayed order deliveries which would add to the labor costs for the operation of the facility.

A fast food facility using the drive-thru system of the present invention can achieve high throughput rates while avoiding the need for additional attendants and/or minimizing occurrences of instances when additional labor might be required to handle exceptional drive-thru vehicular volume.

For example, the system and method of the present invention can handle a vehicle throughput for order placement, order payment and order delivery completion at the rate of at least 240 cars per hour (CPH). Moreover, in providing these throughput rates, it was determined that no additional attendant labor costs would likely be routinely incurred to support delivery of delayed orders to vehicles waiting for and receiving delayed order deliveries in in-line vehicle waiting area 120. Vehicles with a delayed order that were directed forward to in-line vehicle waiting area 120, received delivery of their delayed orders on the average of about 24 seconds from the time they had moved forward from primary food delivery window 84 to in-line vehicle waiting area 120.

Figure 5:
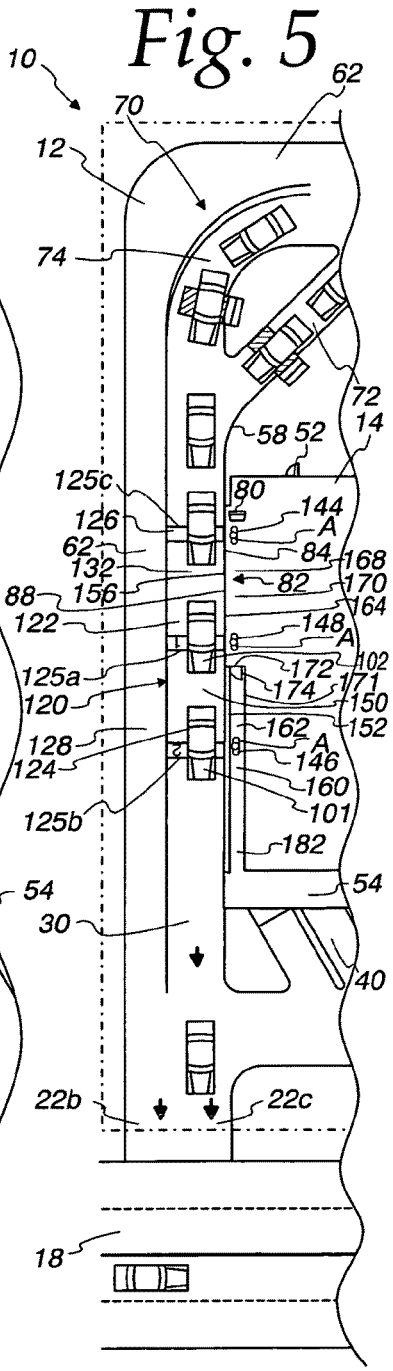
FIG. 5 is a fragmentary plan view of the premises of the drive-thru system in accordance with a second embodiment of the present invention having a first in-line vehicle waiting space that can be accessed by an attendant without walking outside and a second in-line vehicle waiting space that is accessed by an attendant along an outside attendant runway.

FIG. 5 illustrates a second embodiment of the present invention wherein in-line vehicle waiting space 122, which is the closest in-line vehicle waiting space to primary food delivery window 84, is accessible by attendant A to make a delivery of a delayed order from a secondary food delivery window 164 without walking outside. Delivery to the second, more downstream in-line vehicle waiting space 124 is made by attendant A walking outside building 14. FIG. 5 shows an attendant runway 162 that includes an inside upstream portion 170 and a downstream outside portion 160. Upstream portion 170 of attendant runway 162 is sheltered from the outside environment by outer building wall portion 156 and by a door 174 at a doorway 172 that divides inside upstream portion 170 of attendant runway 162 and outside portion 160 of attendant runway 162. Delivery of a delayed order may be made by attendant A walking along an enclosed pathway 168 in upstream portion 170 of attendant runway 162 to travel between primary food delivery area 82 and secondary food delivery window 164. As shown in FIG. 5, outside portion 160 of attendant runway 162 is positioned along a building wall portion 171 and barrier 152. Delivery of a delayed food order to the second more downstream in-line vehicular waiting space 124 is made by attendant A passing through doorway 172 and then walking along the outside portion 160 of the attendant runway 162 to in-line vehicle space 124. In this embodiment, the food delivery area 82 of building 14 retains primary food delivery window 84 from which attendant A positioned adjacent thereto provides the same services for drive-thru customers as previously described. These services include receiving orders from order stations 78, collecting order payments not previously made, delivering ready orders to vehicles through primary food delivery window 84, operating computerized cash register 80, and directing customers with delayed orders to move forward to in-line vehicle waiting spaces 122 or 124. Typically, only deliveries of delayed orders will take place at secondary food delivery window 164, and not the taking of an order or payment therefor, or the operation of computerized cash register 80, although such operation could be performed wirelessly by attendant A when not at window 84, with appropriate equipment, such as a wireless keyboard to input orders into register 80, for example.

Thus, an inside enclosed pathway 168 is provided for quick back and forth movement of attendant A between primary food delivery window 84 and secondary food delivery window 164. Also, since doorway 172 is proximate to secondary food delivery window 164 which, in turn, is also proximate to primary window 84, attendant A stationed at primary delivery window 84, can rapidly make delivery to either of in-line vehicle waiting spaces 122 or 124 and then quickly return to primary food delivery window 84.

More specifically, in the case of delivering a delayed order matched to vehicle 101 at in-line vehicle waiting space 124, attendant A travels along the inside pathway 168 from primary delivery window 84, proceeding downstream past secondary delivery window 164 to doorway 172 and walks outside along outside portion 160 of runway 162 to vehicle 101 waiting at in-line vehicle waiting space 124. Thereafter, attendant A hands the order to the driver of vehicle 101.

In the case of making an inside delivery of a delayed order at secondary delivery window 164, attendant A moves from a position that may be proximate primary window 84, traveling along the enclosed pathway 168 of upstream portion 170 of runway 162 to a position at secondary delivery window 164 and passes the order therethrough to vehicle 102. Thereafter, attendant A may return to a position at primary delivery window 84 to continue servicing drive-thru vehicles. Alternatively, at least a portion of inside pathway 168 between primary delivery window area 82 and the secondary food delivery area 164 may be defined by a hallway within building 14. Inside pathway 168 may also alternatively be provided by including structure (not shown) to enclose an upstream portion of an attendant walkway located outside of building 14. For example, referring to FIG. 4, doorway 140 and door 130 could be relocated downstream to a position that is between in-line waiting space 122 and in-line waiting space 124. The upstream portion of the attendant walkway 142 that is upstream from the relocated doorway could then be enclosed by structure to provide an enclosed inside attendant runway with a delivery window adjacent in-line waiting space 122. Such an inside attendant runway portion would be used by attendant A to make a delayed food order delivery to in-line waiting space 122 without having to leave a sheltered space. The outside portion of the attendant runway would be used to deliver delayed orders to in-line waiting space 124 by passing through the relocated doorway 140.

In any case, inside pathway 168 preferably provides a direct and relatively straight and unobstructed pathway between primary food delivery window 84, secondary delivery window 164 and doorway 172 that opens to outside portion 160 of attendant runway 162. Moreover, it is also preferable that doorway 172 be situated so that attendant A can walk along a relatively straight path from primary food delivery window 84, or from secondary food delivery window 164, to a position adjacent a vehicle in in-line vehicle waiting space 124 without having to turn any corners, so as to allow quick delivery and return to primary food delivery window 84 to continue servicing drive-thru customers.

Figure 6:
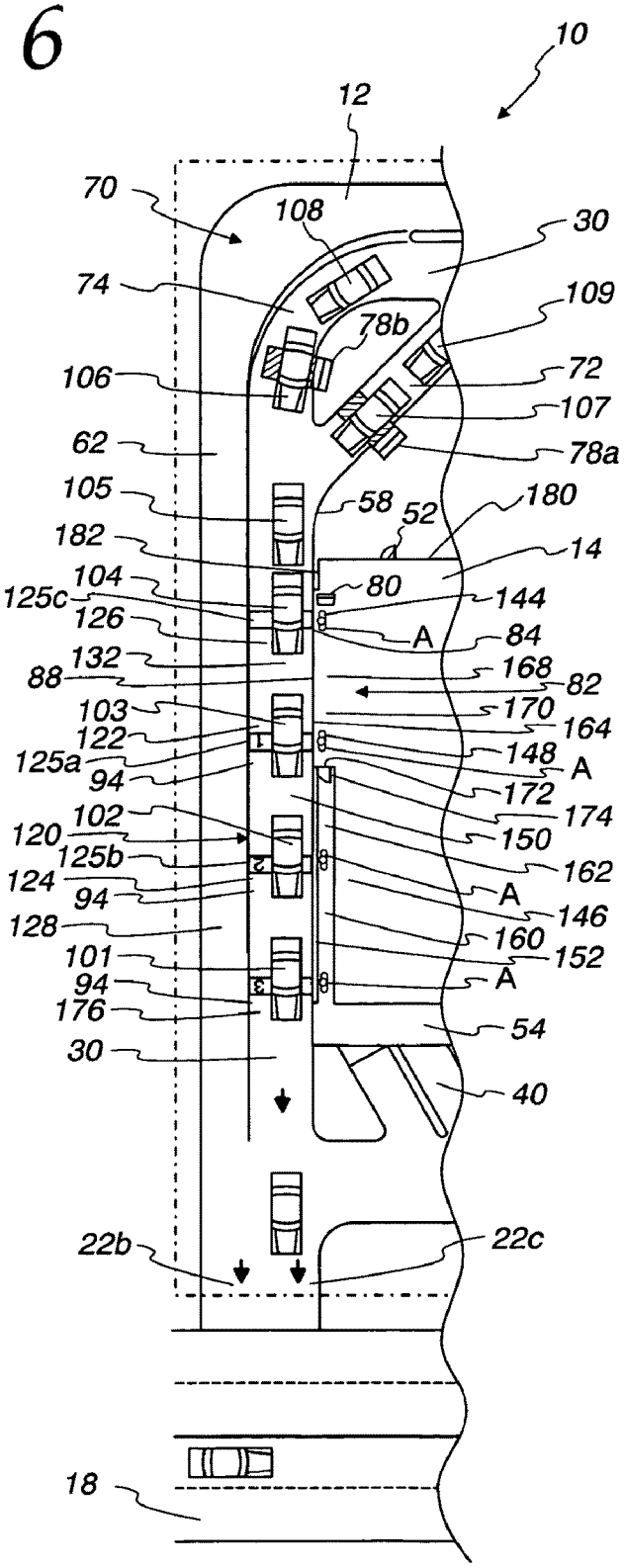
FIG. 6 is a fragmentary plan view of the premises of the drive-thru system in accordance with a third embodiment of the present invention having a first in-line vehicle waiting space that can be accessed by an attendant without walking outside and two in-line vehicle waiting spaces that are accessed by an attendant along an outside attendant runway.

FIG. 6 shows a third embodiment of the present invention that is a modification of the drive-thru system shown in FIG. 5. In this embodiment drive-thru lane 30 includes a third in-line vehicle waiting space 176. Thus, the drive-thru lane illustrated in FIG. 6 has one in-line vehicle waiting space 122 that is accessible by attendant A at secondary window 164 without attendant A having to walk outdoors, and two outside in-line vehicle waiting spaces 124 and 176 that are accessed by attendant A after passing through doorway 172 to outside portion 160 of runway 162. In this modification, depending upon the length of side 182 of building 14, primary food delivery window 84 and secondary food delivery window 164 may need to be shifted towards the rear side 180 of building 14 to accommodate third in-line vehicle waiting space 176.

While not a requirement, it is preferable that primary food delivery window 84, optional secondary food delivery window 164, and in-line vehicle waiting spaces 122,124 and optional third in-line vehicle waiting space 176, all be located along the same side of building 14, such as side 182. This allows attendant A to view the progression of downstream and upstream vehicles from a single location to aid in the efficient management of the vehicle flow through the drive-thru system.

Figure 9:
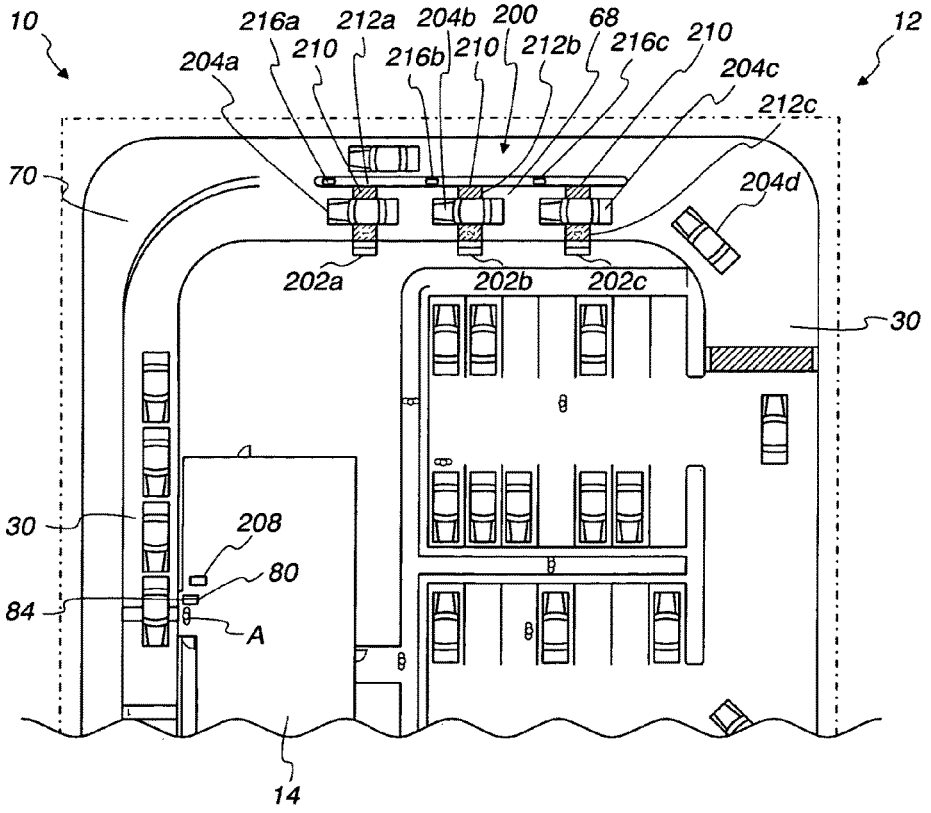
FIG. 9 is a fragmentary plan view of the premises of the drive-thru system in accordance with a fourth embodiment of the present invention illustrating an in-line ordering area.

FIG. 9 shows an alternative embodiment for placing drive-thru orders. In this embodiment, lot layout 12 includes a drive-thru lane 30 with an in-line ordering area 200. In-line ordering area 200 includes a plurality of order stations 202a-c that are arranged in series, rather than the previously described parallel arrangement of order stations 78 shown in FIG. 1. Typically, in-line order area 200 is situated along a straight line segment of drive-thru lane 30, such as a rear segment 68 of drive thru-lane 30. However, in-line order area 200 may also extend around a corner, such as corner 70. In general, order stations 202 may be equipped with any suitable means used for placing orders. Preferably, each of order stations 202 is similar in operation to previously described order stations 78. Thus, each of order stations 202 is equipped to allow drive-thru customers in vehicles 204a-c to place a meal order and pay for the order without leaving their vehicles. Order stations 202 include two way communication means, such as a speaker and microphone, for communicating with an attendant, such as attendant A positioned at point-of-sale cash register 80 in restaurant building 14 as previously described. Verbal orders placed by customers at order stations 202 are entered by attendant A into point-of-sale cash register 80. Once a food order is entered, the order is displayed on the display screen at order station 202 for viewing by the customer. Order stations 202a-c may also have touch screen and/or keypad entry means to allow customers to place an order without assistance from an attendant. Each order station 202 additionally may include payment means to allow a customer in a vehicle 204 parked at order station 202 to pay for the food order. Payment means may include equipment for allowing payment by cash or with a swipecard, such as a credit card, debit card, smart card, RFID card, or gift card. The tracking of orders placed at order stations 202 may be accomplished by any suitable means known to those skilled in the art, such as the previously described equipment and methods utilizing a camera at order stations 202 to take an image of the vehicle, license plate, or driver of the vehicle.

In order to maximize order throughput rates, it important to maximize the accessibility to unoccupied order stations 202 for vehicles approaching the in-line order area 200. Therefore, an in-line order area traffic control system preferably is provided to reduce the likelihood that an upstream vehicle 204d will be required to wait for access to one of order stations 202. For example, this can occur if a vehicle is ordering at order station 202c at a time when order stations 202a and/or 202b are vacant. The automated in-line order area traffic control system includes a computerized traffic controller 208 and a plurality of vehicle sensing devices 210 to automatically determine the location of vehicles 204, including when a vehicle 204 is present at one of order stations 202.

Vehicle sensing devices 210 may be any suitable sensing device, such as a proximity sensor positioned along drive-thru lane segment 68, or a sensor placed within target markings 212a-c at order stations 202a-c, respectively. Additional vehicle sensing devices 210 may also be located along drive-thru lane 30 to determine the presence of vehicles at locations upstream and downstream of in-line vehicle order area 200. This sensed information may also be used by traffic controller 208 in determining the nature of traffic directions provided to vehicles 204. Vehicle sensing devices 210 automatically communicate the sensed vehicle position information to computerized traffic controller 208, typically located within restaurant building 14. Vehicle sensing devices 210 and traffic controller 208 may communicate through hard wiring or through wireless means. To control the traffic within in-line ordering area 200, traffic controller 208 includes a program, processor, and electronic storage means. The traffic control system may be a separate system or may be incorporated into the point-of-sale computerized system.

To accomplish the objective of maximizing access to order stations 202, traffic controller 208 causes traffic instructions to be communicated to the drivers of vehicles 204. For example, as vehicle 204d approaches in-line order area 200, directions are automatically given to proceed to the most downstream available order station 202. Thus, if all orders stations 202a-c are unoccupied, vehicle 204d entering the in-line ordering area 200 is automatically directed to the most downstream available order station 202a, rather than 202b or 202c. If order station 202a is occupied, vehicle 204d approaching in-line order area 200 is directed to the most downstream available order station 202b, rather than 202c. To aid the drivers of vehicles 204 in following the directions provided, each of order stations 202a-c may be assigned an identifying number. For example, order stations 202a-c may be assigned numbers 1, 2, or 3, respectively. These numbers may be displayed at target markings 212a-c, respectively, and/or other locations proximate to order stations 202a-c. The traffic control directions are communicated to vehicle drivers in or entering the in-line ordering area 200. The traffic control directions may be communicated to vehicle drivers by displaying directions on the display screens used to place orders at order stations 202. Alternatively, or additionally, traffic directions may be displayed on one or more separate traffic control devices 216a-c, which may be any suitable signaling means such as a display screen or other means, such as traffic lights which may be stop and go lights or other suitable signaling devices. Traffic signaling devices 216 may also include a speaker that plays prerecorded audio traffic directions. Typically, traffic directions will at least be displayed on the display screens of order stations 202 so that the display screens function as a traffic signaling device. Signaling devices 216 communicate with controller 208 thru hard wiring or wireless means.

In one exemplary instance, all of order stations 202a-c are sensed to be unoccupied by a vehicle. In this case, traffic controller 208 will cause the traffic signaling devices 216b and 216c to provide traffic directions, such as by displaying a message as "Please proceed forward to order station Number 1 to place an order". Also in this same instance, control system 208 automatically disables order stations 202b and 202c so as not to allow a customer to enter an order thereat. This further prompts a vehicle to proceed past order stations 202c and 202b to order station 202a. In another exemplary instance, when order station 202a is occupied, and 202b and 202c are unoccupied, traffic controller 208 will automatically display instructions, at least at signaling device 216c, that directs upstream vehicle 204d to proceed to order station 202b to place an order. At the same time traffic controller 208 automatically disables order station 202c from receiving a food order until it is sensed that vehicle 204d has moved past order station 202c.

After an order is placed at an order station 202, traffic directions are displayed at that signaling device 216 proximate to the order station 202 where the order has been placed, to prompt the vehicle having placed an order to moved further downstream. Such directions, for example, may be "Please proceed to the delivery window to pick up your order." This same message may be displayed at all further downstream unoccupied order stations 202 from the order station 202 where the order was placed. For example, if a vehicle 204 finishes placing an order at order station 202c, and order stations 202a and 202b are unoccupied, the message "Please proceed to the delivery window to pick up your order" is displayed at the display of order station 202c, and preferably also 202b and 202a, and/or other traffic signaling devices 216a, 216b and 216c. By displaying such messages, a vehicle having placed an order will be reminded to move downstream from in-line order area 200, and not remain parked in in-line order area 200 for an unnecessary length of time.

Optionally, the automatic traffic control system may be programmed to provide more specific traffic directions which controller 208 causes to be displayed to a vehicle that has placed an order at order stations 202. As an example, at times a vehicle 204 will have finished placing an order at order station 202c and order station 202b is unoccupied and order station 202a is occupied. Since the vehicle at order station 202c does not have an unobstructed path to delivery window 84, such vehicle may need more specific traffic directions to be prompted to move forward. Thus, rather than a general instruction such as, "Please proceed to the delivery window to pick up your order", a more specific direction such as "Please proceed to order station "2" is displayed at order station 202c. Thereafter, when order station 202a is vacated, traffic controller 208 automatically displays a more general traffic instruction at order stations 202b and 202a, such as to "Please proceed to the delivery window to pick up your order".

Where order stations 202 include means for optionally paying at order stations 202a-c, the timing of the displaying of traffic instructions by controller 208 preferably takes this option into account. For example, as part of the ordering process the customer may be requested to answer whether the customer intends to pay at order station 202 or at delivery window 84. If the customer selects to pay at delivery window 84, traffic directions such as to proceed forward to delivery window 84 are immediately displayed when ordering is finished. If the customer indicates the payment is to be made at order station 202, traffic controller 208 may delay providing traffic directions until the customer makes payment at order station 202. Optionally, for example at times of a sensed back up of vehicles waiting to enter in-line order area 200, traffic directions may be displayed to direct the vehicle to move forward and use a downstream order station 202 to make payment. For example, a customer having placed an order at order station 202c and who has selected to pay for the food order at an order station 202 may be directed to pay at an unoccupied order station 202a or 202b. In this manner order station 202c more quickly becomes available for use by upstream vehicle 204d.

While the in-line traffic control system has been described in connection with three in-line order stations 202, when more than three in-line order stations 202 are provided the principles of controlling the traffic remain the same. Thus, when a vehicle 204 enters in-line ordering area 200, that vehicle is automatically directed to the most downstream unoccupied order station 202. The traffic control system also directs a vehicle that has already finished placing an order and/or having paid for an order, to proceed to delivery window 84, or optionally forward to the most downstream unoccupied order station 202.

Typically, the traffic control system is most advantageously used for lot layouts of limited space that necessitate the use of a trapped configuration for in-line order stations 202. A trapped configuration is one where the in-line order stations 202 are situated so that pulling around downstream occupied order stations 202 is not possible. However, the in-line traffic control system may still be advantageously used in un-trapped configurations wherein a vehicle may have access to a by-pass lane for exiting the in-line ordering area 200 by pulling around downstream vehicles. When using an un-trapped configuration, the traffic control system is still advantageous to maximize the availability of the upstream order stations 202 of in-line order area 200. A traffic control system may also be used in a combined parallel and series order station layout. An example of a combined parallel and series order station layout would be one having parallel ordering lane segments, such as segments 72, 74 shown in FIG. 1, with at least one of the parallel segments having a plurality of in-line order stations 202. For example, three parallel lane segments, each having three in-line order stations 202, would provide a total of nine order stations 202.

Figure 10:
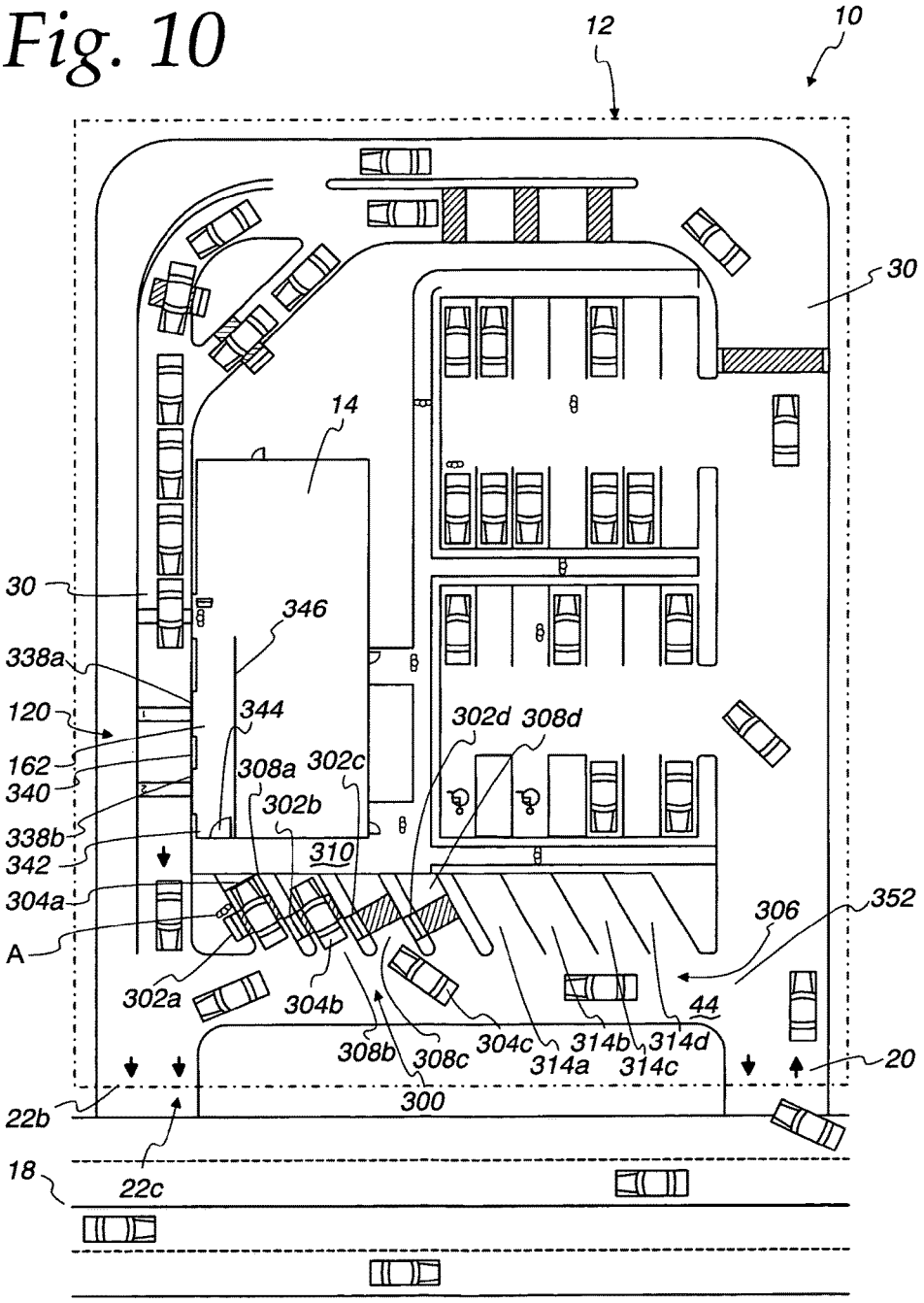
FIG. 10 is a plan view of the premises of the drive-thru system in accordance with a fifth embodiment of the present invention that includes a secondary drive-thru system.

Referring to FIG. 10, another embodiment of the invention is shown that includes a secondary drive-up system 306 that may be used as an alternative option to drive-thru lane 30 for customers desiring drive-thru service at restaurant building 14. Secondary drive-up system 306 includes a combined drive-up order and delivery area 300 that includes a plurality of combined drive-up order and delivery stations 302. Combined drive-up order and delivery area 300 and combined order and delivery stations 302 provide a location at which customers in vehicles 304a-b, for example, can place orders, pay for orders, and wait thereat for an attendant to deliver the order to vehicles 304. Each of order stations 302a-d includes parking spaces 308a-d, respectively. Combined order and delivery parking spaces 308 are situated along front lane 44 adjacent to an attendant walkway 310. Attendant walkway 310 is readily accessed from attendant runway 162. To use combined order and delivery area 300, vehicles 304 pull forward from front lane 44 into parking spaces 308. Thereafter, stations 302a-d may be used to place an order in a similar manner to that used at order stations 78 and 202. Thus, each of stations 302a-d is equipped with two-way communication means for placing verbal orders. Each of stations 302a-d also provides self-ordering means, such as including a display screen to allow customer ordering by touch screen or keypad entries. Stations 302 also have payment devices to allow customer payment for an order by any suitable means including a swipecard, such as credit card, debit cards, gift cards, smart cards or RFID cards. Stations 302 also include means for receiving payment by cash and returning change. In general, stations 302, like order stations 78 and 202, may use any suitable ordering, payment and order tracking systems known to those skilled in the art.

When a food order placed at one of stations 302 becomes ready for delivery, attendant A delivers the ready order to vehicle 304 waiting at order station 302. Typically, in making such delivery attendant A travels a path along runway 162 and attendant walkway 310 to the vehicle 304 parked in the station 302 from which the order originated. Food order matching may be accomplished by the previously described means, or automatically associating the food order to the specific order station 302a-d from which the food order is entered. After a ready food order has been delivered to one of order stations 302a-d, vehicle 304 backs out from parking space 308 into front lane 44, and proceeds forward to exit the premises at egress 22b or 22c. Optionally, additional combined order and delivery stations 302 may be provided, such as at the parking spaces 314a-d. Typically, payment for the food order will be required to be made by the customer using payment means at order stations 302. Optionally, however, payment can be allowed to be collected by attendant A when delivering a food order to stations 302.

Figure 11:
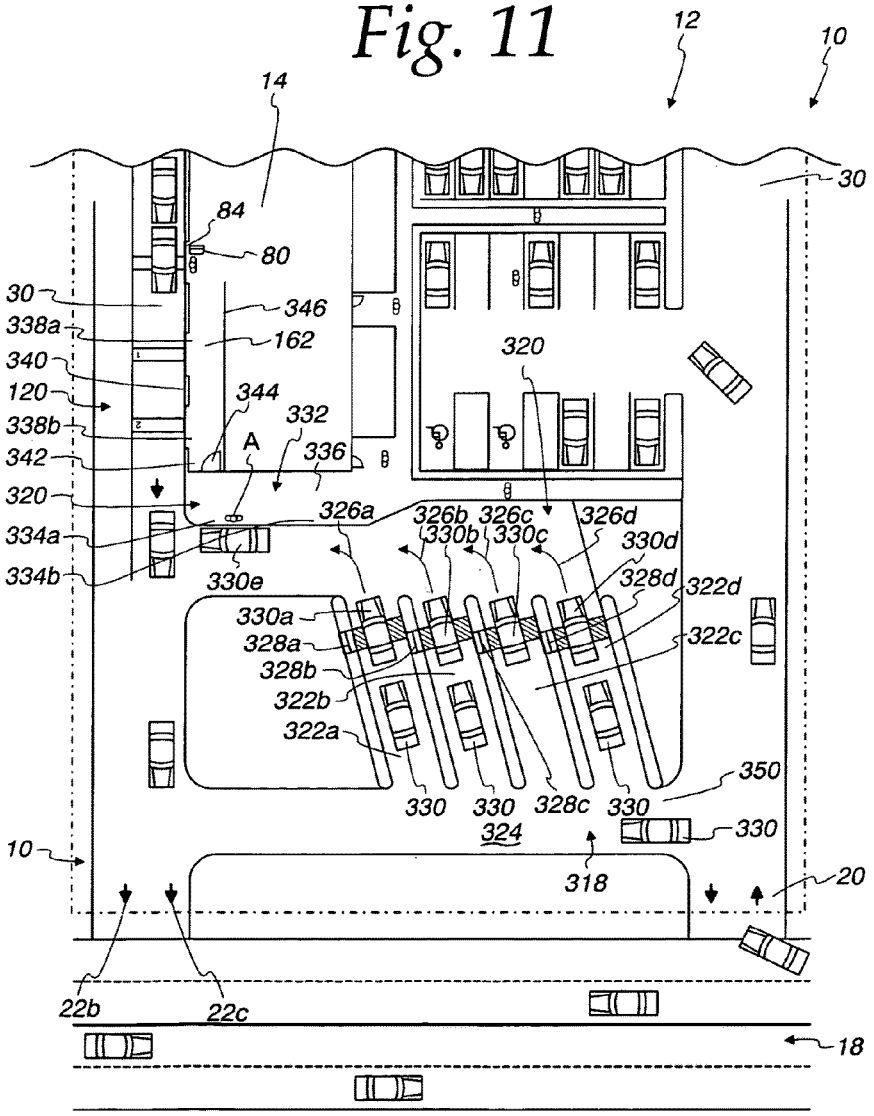
FIG. 11 is a fragmentary plan view of the premises of the drive-thru system in accordance with a sixth embodiment of the present invention that includes a secondary drive-thru system that includes a common food order delivery area.

FIG. 11 illustrates another embodiment of a lot layout that has a secondary drive-thru system. In this embodiment the secondary thru-drive system 318 includes a combined drive-thru order and delivery area 320 that does not require a vehicle to back-up when using the secondary drive-thru system. Combined drive-thru order and delivery area 320 preferably includes a plurality of lane segments 322a-d which may be accessed from lane 324. Each of lane segments 322a-d is equipped with an order station 328a-d that performs the customer ordering and payment functions previously described in connection with order stations 302 of FIG. 10. Lane segments 322 preferably are of a sufficient length to allow the queuing of vehicles 330 in segments 322 behind vehicles 330a-d placing an order at order stations 328a-d, respectively. Preferably, rather than delivering a ready order to order stations 328, combined order and delivery area 320 includes a downstream common delivery area 332 from which deliveries of ready orders can be made to vehicles 330 using order stations 328. Typically, common delivery area 332 will include a primary common delivery location 334a at which most, if not all, deliveries are made. Combined order and delivery area 320 includes lanes 326a-d to provide paths for vehicles 330a-d from order stations 328a-d to common delivery area 332 or more specifically common delivery location 334. Typically, common delivery area 332 and/or common delivery location 334 will include signage or markings to indicate their location. Preferably, common delivery area 332 and common delivery location 334 are located along or proximate to an attendant walkway 336 and are also proximate to attendant runway 162. With this arrangement, attendant A may more readily service vehicles using the in-line waiting area 120, as well as those using the common delivery area 332 to take delivery of their food order.

At certain times it may be desirous to close off operation of secondary drive thru-system 318, and direct drive-thru traffic entering premises 10 at ingress 20 to use the drive-thru lane 30. This may occur at times when traffic lane 324 is or is about to become backed up with vehicles 330 queuing at order stations 328. Thus, the entrance 350 to secondary drive-through system 318 may include a gate (not shown) or other signaling means that can be activated to direct vehicles to use drive-thru lane 30, and not to enter secondary drive-thru system 318. For example, vehicle sensing devices (not shown) may be placed at the most upstream vehicle queuing positions of lanes 322a-d. When all of lanes 322a-d are full of queued vehicles 330, the gate at entrance 350 would be automatically closed by a traffic control system. Incoming drive-thru traffic would be directed to use drive-thru lane 30 until it is sensed that secondary drive-thru system 318 once again has capacity to accept additional drive-thru vehicles. When additional capacity is available, the gate at entrance 350 would be automatically reopened, and any signals directing vehicles to drive-thru lane 30 would then be turned off. The traffic control system could also be used to selectively, or automatically, close down secondary drive-thru system 318 at other desired times. For example, the secondary drive-thru system 318 might be closed down later at night for security reasons. Additionally, secondary drive-thru system 318 might be closed off when drive-thru lane 30 is not experiencing heavy traffic. Such a traffic control system may also be incorporated into secondary drive-up system 306 shown in FIG. 10. For example, entrance 352 to secondary drive-up system 306 may include a gate that is closed when all of order stations 302 are occupied.

FIGS. 10 and 11 also illustrate an embodiment wherein attendant runway 162 is inside restaurant building 14. Inside attendant runway 162 preferably is partitioned by an interior hallway wall 346. In this embodiment, deliveries to vehicles in the in-line waiting area 120 are made by attendant A by passing a food order through one of pass through openings 338a or 338b that appear in an outside wall 340 of restaurant building 14. Typically, this will be a pass-thru window that is slideable to open and close pass-thru opening 338 as necessary. The end 342 of runway 162 includes an egress, such as doorway 344 to provide attendant access to attendant walkway 336 and common delivery area 332. Referring to FIG. 11, when an order placed at one of order stations 328 becomes ready for delivery, the display at the applicable order station 328 displays a message that the order is now ready. Additionally, a message is displayed to instruct the vehicle 330 with the ready order to proceed to common delivery area 332. Typically, deliveries of ready food orders are made at the more specific common delivery location 334a. However, at times deliveries optionally may be made at an alternative delivery location 334b, typically also located on or proximate to attendant walkway 336. Other suitable signaling means known to those skilled in the art alternatively may be used to prompt vehicle 330 to proceed to the common delivery area 332 or more specifically common delivery location 334. In FIG. 11 attendant A is shown having exited attendant runway 162 at doorway 344 and standing at common delivery location 334a to make delivery to vehicle 330e. Delivery can be made through the passenger side window of vehicle 330e, or by attendant A walking to the driver's side of vehicle 330e to deliver the food order. Thereafter, vehicle 330e can exit premises 10 by turning left to proceed to egress 22b or 22c without having to backup to do so, or at any other time in using the secondary drive-thru system. It is noted that while attendant A typically will deliver ready orders from common delivery area 332, attendant A could also, at least in some instances, make food order deliveries directly to vehicles 330 parked at order stations 328.

While the invention has been described with respect to certain preferred embodiments, it is to be understood that the invention is capable of numerous changes, modifications and rearrangements without departing from the scope or spirit of the invention as defined in the claims.

What is claimed is:

1. A vehicular drive-thru food ordering and delivering system comprising;

a lot having a vehicular ingress and vehicular egress thereto;

a building for receiving and filling drive-thru customer orders for delivery to customers, the building having a primary food delivery window for passing food orders through the primary food delivery window to a drive-thru customer;

a vehicular drive-thru lane situated on the lot and passing adjacent to the primary food delivery window, the vehicular drive-thru lane accessible from the lot vehicular ingress and having access to the lot vehicular egress;

at least one order station located remote from the building and along the vehicular drive-thru lane and upstream of the primary food delivery window;

an in-line vehicle waiting area located in the vehicular drive-thru lane a distance downstream of the primary food delivery window so that a vehicle may enter the in-line vehicle waiting area by driving downstream from the primary food delivery window without exiting from the vehicular drive-thru lane, the in-line vehicle waiting area including one or more in-line vehicle waiting spaces in which a vehicle can await delivery of a delayed order, said distance being sufficient to allow an upstream vehicle leaving the primary food delivery window to drive forward and around a downstream vehicle waiting at the in-line vehicle waiting area and to the vehicle egress without backing up;

an attendant runway downstream of the primary food delivery window, at least a portion of the attendant runway positioned in an area outside the building and adjacent to the in-line vehicle waiting area to provide at least a portion of a path from the primary food delivery window to a vehicle waiting in the in-line vehicle waiting area without requiring an attendant to cross over the vehicular drive-thru lane;

a building egress proximate to the primary food delivery window for providing attendant access from the primary food delivery window to the portion of the attendant runway that is outside the building to deliver an order to a vehicle waiting in the in-line vehicle waiting area; and a second vehicle lane positioned along at least a portion of the vehicular drive-thru lane adjacent the in-line vehicle waiting area and being of sufficient length and width to allow a vehicle leaving the primary food delivery window to drive forward and past a downstream vehicle waiting in the in-line vehicle waiting area without having to back up and to thereafter proceed to the lot vehicular egress via the second vehicle lane.

2. The vehicular drive-thru food ordering and delivering system of claim 1 wherein the building has a first side and the pick-up window is located in the first side of the building and the attendant runway is located along the first side of the building and extends along the first side of the building to provide the path to the in-line vehicle waiting area.

3. The vehicular drive-thru food ordering and delivering system of claim 1 wherein the primary food delivery window is used to collect payment for orders not previously paid for, and the building does not have another location for receiving payment from a drive-thru customer in a vehicle made to an attendant in the building and the in-line vehicle waiting area has at least one vehicle waiting space that is located proximate to the primary food delivery window.

4. The vehicular drive-thru food ordering and delivering system of claim 1 further comprising a barrier positioned along and between at least a portion of the attendant runway and the vehicular drive-thru lane for protecting an attendant on the attendant runway from vehicular traffic.

5. The vehicular drive-thru food ordering and delivering system of claim 1 further comprising a display positioned adjacent the in-line vehicle waiting area, the display for displaying information relating to a specific customer's order.

6. The vehicular drive-thru food ordering and delivering system of claim 5 wherein the display is positioned adjacent the portion of the attendant runway that is located outside the building.

7. The vehicular drive-thru food ordering and delivering system of claim 1 wherein the second vehicle lane is a pass-through lane that extends along the outer perimeter of the drive-thru lane.

8. The vehicular drive-thru food ordering and delivering system of claim 1 wherein the in-line vehicle waiting area includes first and second in-line vehicle waiting spaces, the second in-line vehicle waiting space being located downstream from the first in-line vehicle waiting space and the second in-line vehicle waiting space being spaced a sufficient distance from the first vehicle waiting space so that a vehicle waiting at the first in-line vehicle waiting space can drive forward and around a vehicle waiting in the second in-line vehicle waiting space without backing up, and the second vehicle lane is of sufficient length and width to allow use by a vehicle waiting at the first in-line vehicle waiting space to drive forward and around a downstream vehicle waiting in the second in-line vehicle waiting space without backing up and thereafter to proceed to the vehicular egress, and the path from the primary food delivery window to both the first and the second in-line vehicle waiting spaces does not require an attendant to cross the vehicular drive-thru lane to deliver a food order.

9. The vehicular drive-thru food ordering and delivering system of claim 8 further comprising a secondary food delivery window located downstream of the primary food delivery window, the secondary food delivery window being located adjacent the first in-line vehicle waiting space and along an enclosed attendant pathway from the primary food delivery window to the secondary food delivery window to allow delivery of a delayed order through the secondary food delivery window to a vehicle waiting at the first in-line vehicle waiting space, and the second in-line vehicle waiting space is located downstream of the building egress along the portion of the attendant runway that is outside of the building.

10. The vehicular drive-thru food ordering and delivering system of claim 9 further characterized by the in-line vehicle waiting area including a third in-line vehicle waiting space, the third in-line vehicle waiting space located downstream of the second in-line vehicle waiting space and adjacent a portion of the attendant runway that is outside the building.

11. The vehicular drive-thru food ordering and delivering system of claim 1 further comprising order matching means for matching a vehicular drive-thru order with a vehicle and the attendant runway extends entirely along and adjacent to the vehicular drive-thru lane.

12. The vehicular drive-thru food ordering and delivering system of claim 1 further comprising:

an in-line ordering area located in the vehicular drive-thru lane upstream of the primary food delivery window, the in-line ordering area including a plurality of in-line order stations;

a vehicle sensing device capable of detecting if an in-line order station is unoccupied or occupied by a vehicle and communicating the sensed information, a vehicle signaling device capable of providing traffic directions to vehicles in or entering the in-line ordering area;

an in-line ordering area vehicular traffic controller capable of , receiving occupancy information communicated from the vehicle sensing device, and capable of sending a signal to the vehicle signaling device for causing traffic directions to be provided by the vehicle signaling device to vehicles in or entering the in-line ordering area, whereby the traffic directions provided prompt a vehicle to proceed past at least one unoccupied in-line order station to the most downstream unoccupied in-line order station for placing a food order at the most downstream unoccupied order station.

13. The vehicular drive-thru food ordering and delivering system of claim 12 wherein the traffic controller automatically disables an upstream unoccupied in-line order station that the vehicle is prompted to pass by while proceeding to the most downstream unoccupied in-line order station, the automatic disabling at least including not accepting orders from the in-line order station the vehicle is directed to pass by when proceeding to the most downstream unoccupied in-line order station.

14. The vehicular drive-thru food ordering and delivering system of claim 10 further characterized by a display positioned adjacent at least one of the in-line vehicle waiting spaces, the display including information specific to a delayed order for a vehicle waiting in the in-line vehicle waiting space adjacent to the display, the display viewable from said adjacent in-line vehicle waiting space.

15. The vehicular drive-thru food ordering and delivering system of claim 1 further comprising a second order station located along the vehicular drive-thru lane, the second order station in a parallel configuration with the other order station.

16. A method of servicing customers in vehicles in a vehicular drive-thru food ordering and delivering system including a vehicular drive-thru lane with a vehicular ingress and a vehicular egress, a primary food delivery window for use by an attendant to receive payment for drive-thru orders not previously paid for, and to deliver ready orders to customers comprising, delivering a first food order to a first customer in the vehicular drive-thru lane from the primary food delivery window if the first food order for the first customer is a non-delayed order and thereafter allowing the first customer to exit the vehicular drive-thru lane at the vehicular egress;

directing the first customer at the primary food delivery window, if the first order is a delayed order, to move downstream from the primary food delivery window to wait in a downstream in-line vehicle waiting area that is located in the vehicular drive-thru lane, the downstream in-line vehicle waiting area also being located proximate to the primary food delivery window;

providing drive-thru service to a second customer in a vehicle that is upstream from the first customer while the first customer waits in the in-line vehicle waiting area for delivery of a delayed first order, the continued service for the second customer while the first customer waits for the delayed first order including delivering a second order to the second customer from the primary food delivery window when the second order is a non-delayed order and thereafter allowing the second customer to drive forward and around the first customer without backing up to exit at the vehicular egress;

delivering a delayed first order to the first customer waiting in the in-line vehicle waiting area when the delayed first order becomes ready for delivery by an attendant who takes the then ready delayed first order and exits the building through a doorway provided proximate to the primary food delivery window, and thereafter walks along an outside attendant pathway to the first customer waiting in the in-line vehicle waiting area, wherein the attendant pathway from the primary food delivery window to the customer waiting in the in-line vehicle waiting area does not cross the drive-thru lane, and after delivery of the first order to the first customer, allowing the first customer to exit the vehicular drive-thru lane at the vehicular egress.

17. The method of claim 16 further comprising directing the second customer to move away from the primary food delivery window and to wait in the downstream in-line vehicle waiting area if the second order for the second customer is a delayed order.

18. The method of claim 17 further comprising, providing an order placing station where drive-thru customers can place orders from within their vehicles, the drive-thru order station positioned along the vehicular drive-thru lane and positioned remote from the primary food order window;

providing two in-line vehicle waiting spaces in the in-line vehicle waiting area, providing the primary food delivery window in a drive-thru restaurant building, wherein the primary food delivery window allows an attendant adjacent the primary food delivery window to deliver ready customer orders from within the building by exiting the doorway to make a delivery of a delayed order outside the building to customers waiting in either of the in-line vehicle waiting spaces.

19. The method of claim 16 further comprising, providing a first and a second in-line vehicle waiting space in the in-line vehicle waiting area, the second in-line vehicle waiting space located downstream of the first parking space, the first and second in-line vehicle waiting spaces positioned along the attendant pathway and at least the second in-line vehicle waiting space being located downstream from the doorway, the first in-line vehicle waiting space being located a sufficient distance from the second in-line vehicle waiting space so that when a customer is waiting in each of the first and second in-line vehicle waiting spaces, a customer waiting in the first in-line vehicle waiting space that has received delivery of a delayed order is thereafter allowed to drive forward and around the customer waiting in the second in-line vehicle waiting space to exit the vehicular drive-thru lane at the vehicular egress without backing up.

20. The method of claim 18 further comprising, displaying information specific to a delayed order at a location that can be viewed by a customer waiting in the in-line vehicle waiting area.

21. The method of claim 16 further comprising, providing a secondary food delivery window, the secondary food delivery window being located upstream of the doorway and accessible by an attendant leaving the primary food delivery window without the attendant walking outdoors.

22. A quick-service restaurant system for providing both vehicular drive-thru and non-drive-thru customer food ordering comprising, a lot;

at least one vehicular ingress and at least one vehicular egress to the lot;

a building situated on the lot for preparing drive-thru and non-drive-thru customer orders and for delivering of the customer orders to the customers;

a vehicle parking lot area having a plurality of parking spaces for non-drive-thru customers and having vehicular access to at least one vehicular ingress and at least one vehicular egress for the lot;

a pedestrian pathway for non-drive-thru customers to provide a pathway from the vehicle parking lot to the building to allow a non-drive-thru customer to place and receive an order thereat;

a vehicular drive-thru pathway for drive-thru customers, the drive-thru pathway including at least one drive-thru lane with the drive-thru pathway having an inner perimeter, the vehicular drive-thru lane having access to at least one vehicular ingress and access to at least one vehicular egress to the lot;

at least one order station located along the drive-thru pathway for placing drive-thru orders by customers in vehicles;

the building having a delivery window for delivering drive-thru orders to a customer in a drive-thru vehicle, the delivery window located adjacent to the drive-thru [path] *pathway*; and the inner perimeter of the drive-thru pathway being located outwardly from all of the parking spaces of the non-drive-thru parking lot area and outwardly from the pedestrian pathways and the building, so that non-drive-thru customers can use the parking lot area and the pedestrian pathway without walking through the vehicular drive-thru pathway.

23. A vehicular drive-thru food ordering and delivering system comprising:

a lot having a vehicular ingress and vehicular egress thereto;

a building for receiving and filling drive-thru customer orders for delivery to customers, the building having a primary food delivery window for passing food orders through the primary food delivery window to a drive-thru customer;

a primary vehicular drive-thru lane situated on the lot and passing adjacent to the primary food delivery window, the vehicular drive-thru lane accessible from the lot vehicular ingress and having access to the lot vehicular egress;

at least one order station located remote from the building and along the primary vehicular drive-thru lane and upstream of the primary food delivery window;

an in-line vehicle waiting area located in the primary vehicular drive-thru lane a distance downstream of the primary food delivery window so that a vehicle may enter the in-line vehicle waiting area by driving downstream from the primary food delivery window without exiting from the primary vehicular drive-thru lane, the in-line vehicle waiting area including one or more in-line vehicle waiting spaces in which a vehicle can await delivery of a delayed order, said distance being sufficient to allow an upstream vehicle leaving the primary food delivery window to drive forward and around a downstream vehicle waiting at the in-line vehicle waiting area and to the vehicle egress without backing up;

an attendant runway downstream of the primary food delivery window adjacent to the in-line vehicle waiting area to provide at least a portion of a path from the primary food delivery window to a vehicle waiting in the in-line vehicle waiting area;

at least one pass-thru opening adjacent to the attendant runway and the in-line vehicle waiting area for passing a food order from the attendant runway to a vehicle waiting in the in-line vehicle waiting area;

a secondary vehicle lane positioned along at least a portion of the vehicular drive-thru lane adjacent the in-line vehicle waiting area and being of sufficient length and width to allow a vehicle leaving the primary food delivery window to drive forward and past a downstream vehicle waiting in the in-line vehicle waiting area without having to back up and to thereafter proceed to the lot vehicular egress via the secondary vehicle lane;

a secondary drive-thru system remote from the building, the secondary drive-thru system including a drive-thru order area and a delivery area for use by drive-thru vehicles not placing food orders in the primary vehicular drive-thru lane, the secondary drive-thru system including at least one order station where a food order is placed and at least one delivery area to which a food order placed in the secondary drive-thru system is delivered; and a building egress proximate to the attendant runway for providing attendant access from the attendant runway to the outside of the building to deliver a food order placed from the order station of the secondary drive-thru system to a vehicle waiting in the delivery area of the secondary drive-thru system.

24. The vehicular drive-thru food ordering and delivering system as claimed in claim 23 further characterized by the secondary drive-thru system includes a plurality of order stations that are combined order and delivery stations for both placing a food order and receiving delivery of the food order placed from the secondary drive-thru system.

25. The vehicular drive-thru food ordering and delivering system as claimed in claim 23 further comprising the secondary drive-thru system including a plurality of order stations for placing food orders therefrom, and a common delivery area for making delivery thereat of food orders placed at the plurality of order stations in the secondary drive-thru system, the common delivery area located proximate to the building egress and downstream from the order stations in the secondary drive-thru system whereby a vehicle placing an order at an order station in the secondary drive-thru system can drive forward from the order station to receive delivery of the food order from an attendant in the common delivery area and thereafter exit the premises without backing up.

26. The system of claim 22 further comprising:

an in-line vehicle waiting area located in the drive-thru lane a distance downstream of the delivery window so that a vehicle may enter the in-line vehicle waiting area by driving downstream from the delivery window without exiting from the drive-thru lane, the in-line vehicle waiting area including one or more in-line vehicle waiting spaces in which a vehicle can await delivery of a delayed order, said distance being sufficient to allow an upstream vehicle leaving the delivery window to drive forward and around a downstream vehicle waiting at the in-line vehicle waiting area and to the vehicle egress without backing up; and an attendant runway downstream of the delivery window, at least a portion of the attendant runway positioned in an area outside the building and adjacent to the in-line vehicle waiting area to provide at least a portion of a path from the delivery window to a vehicle waiting in the in-line vehicle waiting area without requiring an attendant to cross over the drive-thru lane.

*27. A vehicular drive-thru food ordering and delivering system comprising;*

*a lot having a vehicular ingress and vehicular egress thereto;*

*a building for receiving and filling drive-thru customer orders for delivery to customers, the building having a primary food delivery window for passing food orders through the primary food delivery window to a drive-thru customer;*

*a vehicular drive-thru lane situated on the lot and passing adjacent to the primary food delivery window, the vehicular drive-thru lane accessible from the lot vehicular ingress and having access to the lot vehicular egress;*

*at least one order station located along the vehicular drive-thru lane and upstream of the primary food delivery window;*

*an in-line vehicle waiting area located a distance downstream of the primary food delivery window so that a vehicle may enter the in-line vehicle waiting area by driving downstream from the primary food delivery window, the in-line vehicle waiting area including one or more in-line vehicle waiting spaces in which a vehicle can await delivery of a delayed order, said distance being sufficient to allow an upstream vehicle leaving the primary food delivery window to drive forward and around a downstream vehicle waiting at the in-line vehicle waiting area and to the vehicle egress without backing up; and*

*a secondary food delivery window located downstream of the primary food delivery window, the secondary food delivery window being located adjacent the first in-line vehicle waiting space and adjacent an enclosed attendant pathway accessible from the primary food delivery window and the secondary food delivery window, to allow delivery of a delayed order through the secondary food delivery window to a vehicle waiting at the first in-line vehicle waiting space.*

*28. The vehicular drive-thru food ordering and delivering system of claim 27, said downstream distance from the primary food delivery window to the vehicle waiting area being sufficient to allow an upstream vehicle leaving the primary food delivery window to drive forward and around a downstream vehicle waiting at the in-line vehicle waiting area without backing up, further comprising a vehicle lane positioned along at least a portion of and adjacent the in-line vehicle waiting area and being of sufficient length and width to allow a vehicle leaving the primary food delivery window to drive forward and past a downstream vehicle waiting in the in-line vehicle waiting area without having to back up and to thereafter proceed to the lot vehicular egress.*

*29. The vehicular drive-thru food ordering and delivering system of claim 27 wherein the in-line vehicle waiting area is located in the vehicular drive-thru lane.*

*30. The vehicular drive-thru food ordering and delivering system of claim 29 wherein a vehicle may enter the in-line vehicle waiting area without exiting from the vehicular drive-thru lane.*

*31. The vehicular drive-thru food ordering and delivering system of claim 27 wherein at least a portion of the attendant runway is positioned in an area outside the building.*

*32. The vehicular drive-thru food ordering and delivering system of claim 27 wherein the entire attendant runway is located inside the building.*

*33. The vehicular drive-thru food ordering and delivering system of claim 32 wherein the building has a first side and the pick-up window is located in the first side of the building and the attendant runway is located along the first side of the*

*building and extends along the first side of the building to provide the path to the in-line vehicle waiting area.*

*34. The vehicular drive-thru food ordering and delivering system of claim 27 wherein the building has a first side and the pick-up window is located in the first side of the building and the attendant runway is located along the first side of the building and extends along the first side of the building to provide the path to the in-line vehicle waiting area.*

*35. The vehicular drive-thru food ordering and delivering system of claim 34 wherein the first side of the building is at least generally linear.*

*36. The vehicular drive-thru food ordering and delivering system of claim 35 wherein the first side of the building is at least generally linear.*

*37. The vehicular drive-thru food ordering and delivering system of claim 35 further comprising a secondary food delivery window located downstream of the primary food delivery window, the secondary food delivery window being located adjacent the first in-line vehicle waiting space and adjacent an enclosed attendant pathway accessible from the primary food delivery window and the secondary food delivery window, to allow delivery of a delayed order through the secondary food delivery window to a vehicle waiting at the first in-line vehicle waiting space.*

*38. The vehicular drive-thru food ordering and delivering system of claim 34 wherein the first side of the building is linear.*

*39. The vehicular drive-thru food ordering and delivering system of claim 38 wherein the first side of the building is linear.*

*40. The vehicular drive-thru food ordering and delivering system of claim 27 wherein the primary food delivery window is used to collect payment for orders not previously paid for, and the building does not have another location for receiving payment from a drive-thru customer in a vehicle made to an attendant in the building and the in-line vehicle waiting area has at least one vehicle waiting space that is located proximate to the primary food delivery window.*

*41. The vehicular drive-thru food ordering and delivering system of claim 27 further comprising a barrier positioned along and between at least a portion of the attendant runway and the vehicular drive-thru lane for protecting an attendant on the attendant runway from vehicular traffic.*

*42. The vehicular drive-thru food ordering and delivering system of claim 27 further comprising a display positioned adjacent the in-line vehicle waiting area, the display for displaying information relating to a specific customer's order.*

*43. The vehicular drive-thru food ordering and delivering system of claim 42 wherein the display is positioned adjacent the portion of the attendant runway that is located outside the building.*

*44. The vehicular drive-thru food ordering and delivering system of claim 27 wherein the vehicle lane positioned along a portion of and adjacent the in-line vehicle waiting area is a pass-through lane that extends along the outer perimeter of the drive-thru lane.*

*45. The vehicular drive-thru food ordering and delivering system of claim 27 wherein the in-line vehicle waiting area includes first and second in-line vehicle waiting spaces, the second in-line vehicle waiting space being located downstream from the first in-line vehicle waiting space and the second in-line vehicle waiting space being spaced a sufficient distance from the first vehicle waiting space so that a vehicle waiting at the first in-line vehicle waiting space can drive forward and around a vehicle waiting in the second in-line vehicle waiting space without backing up, and the second vehicle lane is of sufficient length and width to allow use by a vehicle waiting at the first in-line vehicle waiting space to drive forward and around a downstream vehicle waiting in the second in-line vehicle waiting space without backing up and thereafter to proceed to the vehicular egress, and the path from the primary food delivery window to both the first and the second in-line vehicle waiting spaces does not require an attendant to cross the vehicular drive-thru lane to deliver a food order.*

*46. The vehicular drive-thru food ordering and delivering system of claim 45 wherein the second in-line vehicle waiting space is located downstream of the building egress along a portion of the attendant runway that is outside of the building.*

*47. The vehicular drive-thru food ordering and delivering system of claim 27 wherein the attendant pathway from the secondary food delivery window to the food delivery window located adjacent the second in-line vehicle waiting space is located inside the building.*

*48. The vehicular drive-thru food ordering and delivering system of claim 27 further comprising:*

*a vehicle parking lot having a plurality of parking spaces for non-drive-thru customers and having vehicular access to at least one vehicular ingress and at least one vehicular egress for the lot;*

*a pedestrian pathway for non-drive-thru customers to provide a pathway from the vehicle parking lot to the building to allow a non-drive-thru customer to place and receive an order thereat;*

*the vehicular drive-thru lane comprising a vehicular drive-thru pathway for drive-thru customers, the drive-thru pathway including at least one drive-thru lane with the drive-thru pathway having an inner perimeter, the vehicular drive-thru lane having access to at least one vehicular ingress and access to at least one vehicular egress to the lot;*

*the inner perimeter of the drive-thru pathway being located outwardly from at least some of the parking spaces of the non-drive-thru parking lot and outwardly from at least a portion of the pedestrian pathway and the building, so that non-drive-thru customers can use the at least some of the parking spaces and the at least a portion of the pedestrian pathway without walking across the vehicular drive-thru pathway.*

*49. The vehicular drive-thru food ordering and delivering system of claim 27 further comprising:*

*an in-line ordering area located in the vehicular drive-thru lane upstream of the primary food delivery window, the in-line ordering area including a plurality of in-line order stations;*

*a vehicle sensing device capable of detecting if an in-line order station is unoccupied or occupied by a vehicle and communicating the sensed information,*

*a vehicle signaling device capable of providing traffic directions to vehicles in or entering the in-line ordering area;*

*an in-line ordering area vehicular traffic controller capable of receiving occupancy information communicated from the vehicle sensing device, and capable of sending a signal to the vehicle signaling device for causing traffic directions to be provided by the vehicle signaling device to vehicles in or entering the in-line ordering area, whereby the traffic directions provided prompt a vehicle to proceed past at least one unoccupied in-line order station to the most downstream*

*unoccupied in-line order station for placing a food order at the most downstream unoccupied order station.*

*50. The vehicular drive-thru food ordering and delivering system of claim 49 wherein the traffic controller automatically disables an upstream unoccupied in-line order station that the vehicle is prompted to pass by while proceeding to the most downstream unoccupied in-line order station, the automatic disabling at least including not accepting orders from the in-line order station the vehicle is directed to pass by when proceeding to the most downstream unoccupied in-line order station.*

*51. A method of servicing customers in vehicles in a vehicular drive-thru food ordering and delivering system including a vehicular drive-thru lane with a vehicular ingress and a vehicular egress, a primary food delivery window for use by an attendant to receive payment for drive-thru orders not previously paid for, and to deliver ready orders to customers comprising,*

*delivering a first food order to a first customer in the vehicular drive-thru lane from the primary food delivery window if the first food order for the first customer is a non-delayed order and thereafter allowing the first customer to exit the vehicular drive-thru lane at the vehicular egress;*

*directing the first customer at the primary food delivery window, if the first order is a delayed order, to move downstream from the primary food delivery window to wait in a downstream in-line vehicle waiting area, the downstream in-line vehicle waiting area also being located proximate to the primary food delivery window;*

*providing drive-thru service to a second customer in a vehicle that is upstream from the first customer while the first customer waits in the in-line vehicle waiting area for delivery of a delayed first order, the continued service for the second customer while the first customer waits for the delayed first order including delivering a second order to the second customer from the primary food delivery window when the second order is a non-delayed order and thereafter allowing the second customer to drive forward and around the first customer without backing up to exit at the vehicular egress;*

*delivering a delayed first order to the first customer waiting in the in-line vehicle waiting area when the delayed first order becomes ready for delivery by an attendant who takes the then ready delayed first order and travels along an attendant pathway to the first customer waiting in the in-line vehicle waiting area, wherein the attendant pathway from the primary food delivery window to the customer waiting in the in-line vehicle waiting area does not cross the drive-thru lane, and after delivery of the first order to the first customer, allowing the first customer to exit at the vehicular egress.*

*52. The method of claim 51 wherein the attendant travels along an attendant pathway that is entirely located within the building to the first customer waiting in the in-line vehicle waiting area.*

*53. The method of claim 51 further comprising directing the second customer to move away from the primary food delivery window and to wait in the downstream in-line vehicle waiting area if the second order for the second customer is a delayed order.*

*54. The method of claim 53 further comprising,*

*providing an order placing station where drive-thru customers can place orders from within their vehicles, the drive-thru order station positioned along the vehicular drive-thru lane and positioned remote from the primary food order window;*

*providing two in-line vehicle waiting spaces in the in-line vehicle waiting area,*

*providing the primary food delivery window in a drive-thru restaurant building, wherein the primary food delivery window allows an attendant adjacent the primary food delivery window to deliver ready customer orders from within the building by exiting the doorway to make a delivery of a delayed order outside the building to customers waiting in either of the in-line vehicle waiting spaces.*

*55. The method of claim 52 further comprising,*

*providing a first and a second in-line vehicle waiting space in the in-line vehicle waiting area, the second in-line vehicle waiting space located downstream of the first parking space, the first and second in-line vehicle waiting spaces positioned along the attendant pathway and at least the second in-line vehicle waiting space being located downstream from the doorway, the first in-line vehicle waiting space being located a sufficient distance from the second in-line vehicle waiting space so that when a customer is waiting in each of the first and second in-line vehicle waiting spaces, a customer waiting in the first in-line vehicle waiting space that has received delivery of a delayed order is thereafter allowed to drive forward and around the customer waiting in the second in-line vehicle waiting space to exit the vehicular drive-thru lane at the vehicular egress without backing up.*

*56. The method of claim 51 wherein the delayed first order is delivered through a secondary food delivery window, the secondary food delivery window being located downstream of the primary food delivery window and accessible by an attendant leaving the primary food delivery window without the attendant walking outdoors.*

*57. A quick-service restaurant system for providing both vehicular drive-thru and non-drive-thru customer food ordering comprising,*

*a lot;*

*at least one vehicular ingress and at least one vehicular egress to the lot;*

*a building, dedicated to one restaurant, situated on the lot for preparing drive-thru and non-drive-thru customer orders and for delivering of the customer orders to the customers;*

*a vehicle parking lot having a plurality of parking spaces for non-drive-thru customers and having vehicular access to at least one vehicular ingress and at least one vehicular egress for the lot;*

*a pedestrian pathway for non-drive-thru customers to provide a pathway from the vehicle parking lot to the building to allow a non-drive-thru customer to place and receive an order thereat;*

*a vehicular drive-thru pathway for drive-thru customers, the drive-thru pathway including at least one drive-thru lane with the drive-thru pathway having an inner perimeter, the vehicular drive-thru lane having access to at least one vehicular ingress and access to at least one vehicular egress to the lot;*

*at least one order station located along the drive-thru pathway for placing drive-thru orders by customers in vehicles;*

*the building having a delivery window for delivering drive-thru orders to a customer in a drive-thru vehicle, the delivery window located adjacent to the drive-thru path; and*

*the inner perimeter of the drive-thru pathway being located outwardly from all of the parking spaces of the parking lot and outwardly from the pedestrian pathway and the building, so that non-drive-thru customers can use the parking lot and the pedestrian pathway without walking through the vehicular drive-thru pathway.*

* * * * *